(12) United States Patent
Ogilvie

(10) Patent No.: US 8,997,159 B2
(45) Date of Patent: Mar. 31, 2015

(54) ON-BOARD VESSEL ENTERTAINMENT SYSTEM

(75) Inventor: Charles Ogilvie, Burlingame, CA (US)

(73) Assignee: Virgin America Inc., Burlingame, CA (US)

( * ) Notice: Subject to any disclaimer, the term of this patent is extended or adjusted under 35 U.S.C. 154(b) by 169 days.

(21) Appl. No.: 11/853,016

(22) Filed: Sep. 10, 2007

(65) Prior Publication Data

US 2008/0141315 A1   Jun. 12, 2008

Related U.S. Application Data

(60) Provisional application No. 60/825,071, filed on Sep. 8, 2006.

(51) Int. Cl.
  H04N 7/18     (2006.01)
  H04N 21/472   (2011.01)
  H04N 7/15     (2006.01)
  H04N 21/214   (2011.01)
  H04N 21/414   (2011.01)

(52) U.S. Cl.
  CPC .............. *H04N 21/472* (2013.01); *H04N 7/15* (2013.01); *H04N 7/18* (2013.01); *H04N 21/2146* (2013.01); *H04N 21/41422* (2013.01)
  USPC .................... 725/76; 725/74; 725/75; 725/77

(58) Field of Classification Search
  USPC .................................. 705/22; 725/43, 74–77
  See application file for complete search history.

(56) References Cited

U.S. PATENT DOCUMENTS

| | | | | |
|---|---|---|---|---|
| 5,311,302 A * | 5/1994 | Berry et al. | ................. | 348/14.03 |
| 6,081,830 A * | 6/2000 | Schindler | ...................... | 709/204 |
| 6,088,681 A * | 7/2000 | Coleman et al. | ................. | 705/15 |
| 6,177,887 B1 * | 1/2001 | Jerome | ........................ | 725/76 |
| 6,188,991 B1 * | 2/2001 | Rosenweig et al. | ............ | 705/29 |
| 6,249,913 B1 | 6/2001 | Galipeau et al. | | |
| 6,748,597 B1 * | 6/2004 | Frisco et al. | ..................... | 725/76 |
| 7,027,999 B2 * | 4/2006 | Smith et al. | ..................... | 705/10 |
| 7,756,746 B2 * | 7/2010 | Walker et al. | .................... | 705/15 |
| 7,945,934 B2 * | 5/2011 | Margis et al. | ................... | 725/75 |
| 2001/0023499 A1 * | 9/2001 | Wakahara | ...................... | 725/143 |
| 2002/0052790 A1 * | 5/2002 | Tomishima | ...................... | 705/15 |
| 2002/0178451 A1 * | 11/2002 | Ficco | ............................... | 725/76 |
| 2003/0009761 A1 | 1/2003 | Miller et al. | | |
| 2003/0036977 A1 * | 2/2003 | Morse | ............................ | 705/27 |
| 2003/0126250 A1 | 7/2003 | Jhanji | | |
| 2003/0192052 A1 | 10/2003 | Frisco et al. | | |

(Continued)

OTHER PUBLICATIONS

Darren Booth, Touchscreen, On-Demand Meal Feature Debuts on Japan Airlines, www.cnbc.com.*

(Continued)

*Primary Examiner* — Fernando Alcon
(74) *Attorney, Agent, or Firm* — Fenwick & West LLP

(57) ABSTRACT

An improved user experience is provided for passengers on a vessel such as an airplane, train or ship. Passengers can customize their travel experience ahead of time by accessing a web-based server system to indicate preferences with respect to a number of in-flight entertainment options. The passenger's experience is also enhanced by allowing passengers to share preferences such as media playlists with others. Meals can be ordered on-demand once on board, and seat-to-seat chat as well as group chatting is also made available through an in-seat or other proximate entertainment device.

16 Claims, 29 Drawing Sheets

(56) References Cited

U.S. PATENT DOCUMENTS

| | | | |
|---|---|---|---|
| 2005/0028208 | A1 | 2/2005 | Ellis et al. |
| 2005/0129239 | A1* | 6/2005 | Farley et al. ............... 380/270 |
| 2005/0240494 | A1 | 10/2005 | Cue et al. |
| 2005/0273345 | A1* | 12/2005 | Castillejo Romero ............ 705/1 |
| 2006/0212909 | A1* | 9/2006 | Girard et al. .................... 725/73 |
| 2006/0248557 | A1* | 11/2006 | Stark et al. ...................... 725/37 |
| 2006/0282398 | A1* | 12/2006 | Mueller et al. ................. 705/400 |
| 2007/0201482 | A1 | 8/2007 | Kharebov et al. |

OTHER PUBLICATIONS

PCT International Search Report and Written Opinion, PCT/US07/78082, Mar. 21, 2008, 15 pages.

"Hughes-Avicom International Wins Inflight Entertainment Contract with Air China," The Free Library by Farlex, Aug. 5, 1996, 2 pages, [Online] [Retrieved on Jun. 30, 2010] Retrieved from the Internet<URL:http://www.thefreelibrary.com/HUGHES-AVICOM+INTERNATIONAL+WINS+INFLIGHT+ENTERTAINMENT+CONTRACT+WITH...-a018547061>.

"Interactive Flight Technologies Selects Hollingsead International as Supplier for Systems Integration," The Free Library by Farlex, 1996, 2 pages, [Online] [Retrieved on Jun. 30, 2010] Retrieved from the Internet<URL:http://www.thefreelibrary.com/Interactive+Flight+Technologies+selects+Hollingsead+International+as...-a018526374>.

Lawrence, J., "Will Interactive Fly on Planes? Northwest Grounds Its Plan, But Other Airlines Waiting in the Wings," Advertising Age, Oct. 10, 1994, 4 pages, [Online] [Retrieved on Jun. 30, 2010] Retrieved from the Internet<URL:http://adage.com/article?article_id=89796>.

Medearis, J., "That's In-Flight Entertainment—for the Jet Set: Airlines: Valencia-based Airvision May Be in for a Dogfight as it Offers Carriers a Program That Does Much More Than Show Movies," Jan. 29, 1991, 2 pages, [Online] [Retrieved on Aug. 28, 2013] Retrieved from the Internet<URL:http://articles.latimes.com/1991-01-29/business/fi-236_1_entertainment-systems>.

United States Office Action, U.S. Appl. No. 13/357,789, Feb. 22, 2013, 15 pages.

United States Office Action, U.S. Appl. No. 13/358,023, Mar. 4, 2013, 8 pages.

* cited by examiner

VIEW ORDERS

| ID | SEAT | TIME | STATUS | | | |
|----|------|------|--------|---|---|---|
| 01 | 13C | 09:54:07.0 | In Progress | Complete Order | Cancel Order | View Order |
| 96 | 14D | 10:11:13.0 | In Progress | Complete Order | Cancel Order | View Order |
| 77 | 14F | 09:59:29.0 | In Progress | Complete Order | Cancel Order | View Order |
| 72 | 17E | 10:25:19.0 | In Progress | Complete Order | Cancel Order | View Order |
| 89 | 23C | 04:49:48.0 | In Progress | Complete Order | Cancel Order | View Order |
| 67 | 5A | 02:48:27.0 | In Progress | | Cancel Order | View Order |
| 88 | 5B | 04:49:33.0 | | | | |

ORDERS: 7

VIEW IN-PROGRESS | VIEW CANCELLED | VIEW COMPLETED | PRINT ALL

INVENTORY | NEW ORDER | ORDERS | STATUS

UP / DOWN

Fig. 27

SEAT: 14D     ORDER DETAILS

| | ITEMS | QTY | PRICE | SUBTOTAL | UP |
|---|---|---|---|---|---|
| 1 | breakfast selection | 1 | $3.50 | $3.50 | |
| 2 | becks | 1 | $5.00 | $5.00 | |
| 3 | heineken | 1 | $6.00 | $6.00 | |
| 4 | cabernet sauvignon | 1 | $6.50 | $6.50 | |
| | | | | | |
| | | | | | |
| | | Total 4 | | $19.00 | DOWN |

| EDIT | CANCEL ORDER | PRINT | BACK |
|---|---|---|---|

| INVENTORY | NEW ORDER | ORDERS | STATUS |
|---|---|---|---|

ON-BOARD VESSEL ENTERTAINMENT SYSTEM

CROSS-REFERENCE TO RELATED APPLICATIONS

This application claims the benefit of U.S. Provisional Patent Application Ser. No. 60/825,071, filed on Sep. 8, 2006, and incorporated by reference herein in its entirety.

BACKGROUND OF THE INVENTION

1. Field of the Invention

The present invention relates generally to a vessel entertainment system. More specifically, the present invention is directed toward an on-board system for use on airplanes, trains, ships and other vessels, and which enables entertainment and communications features customizable by each passenger.

2. Description of the Related Art

Many commercial vessels designed to carry passengers include entertainment systems. For example, many airlines operate aircraft—particularly on international flight segments—that include displays mounted in the back of each seat, allowing passengers to watch in-flight movies, television shows, and view real-time maps showing the aircraft's location, airspeed, and distance to destination. However, the features available using these conventional devices are limited.

SUMMARY OF THE INVENTION

The present invention enables an improved user experience for passengers on a vessel. Passengers can customize their travel experience ahead of time by accessing a web-based server system to indicate preferences with respect to a number of in-flight entertainment options. The passenger's experience is also enhanced by allowing passengers to share preferences such as media playlists with others.

In one embodiment, a user creates a profile on a website associated with the vessel in which he will be traveling, for example, an airline or train company website. Once the passenger has an account with the website, he specifies preferences, which may include creating audio playlists, video (movies and television) playlists, meal preferences, buddy lists, and privacy preferences. User preference data is stored in an account associated with the user.

Next, the user makes arrangements to travel aboard the vessel. For example, the user may be an airline passenger making arrangements to travel aboard a specific flight. Once the reservation is made, the user's preference data is associated with the reservation and is preloaded on the vessel prior to the user's voyage. When the passenger arrives aboard the vessel, he authenticates himself at a terminal known as an entertainment device on board the vessel. A user interface configured according to his specified preference data is then displayed. While on board, the passenger can interact with the entertainment device to listen to music, watch videos, chat with other passengers individually or in a group, order meals, check e-mail, and the like. Updates to user preferences are stored locally on board the vessel and forwarded to the ground-based site when a connection is available. In an alternative embodiment, a connection is available while the vessel is underway, and the local system can communicate with the ground-based site in real time instead of through a store-and-forward method, allowing instant authentication and updating of the user's account.

BRIEF DESCRIPTION OF THE DRAWINGS

FIG. 27 illustrates an order fulfillment screen in accordance with an embodiment of the present invention.

FIG. 28 illustrates a detailed order view screen in accordance with an embodiment of the present invention.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
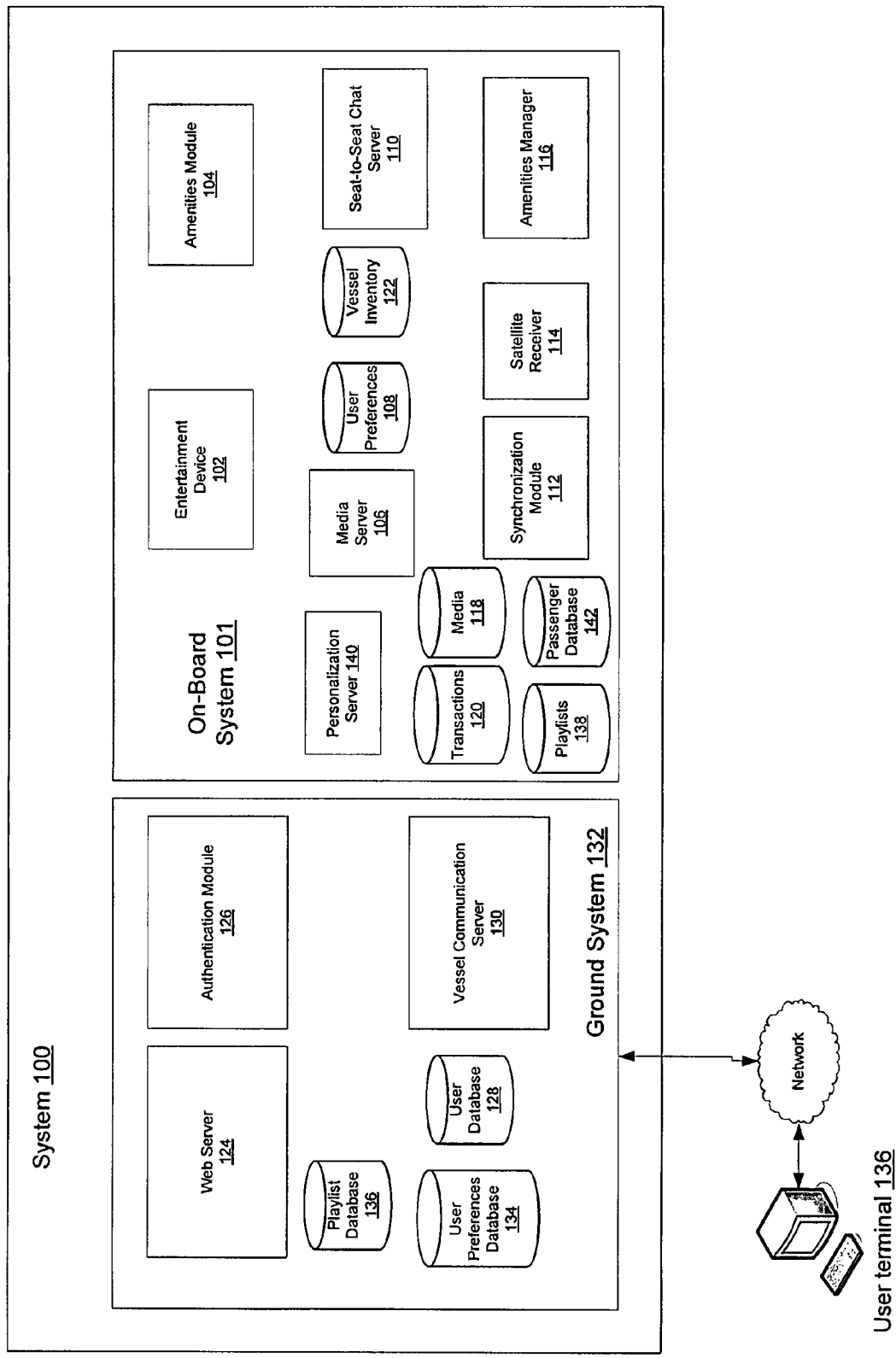
FIG. 1 is a block diagram of a system in accordance with an embodiment of the present invention.

FIG. 1 illustrates a system 100 for providing on-board services and entertainment in accordance with an embodiment of the present invention. System 100 includes a ground system 132 and an on-board system 101. Ground system 132 includes a web server 124, authentication module 126, user database 128, preferences database 134, playlist database 136, and vessel communication server 130. On-board system 101 includes entertainment devices 102, amenities module 104, media server 106, user preferences database 108, seat-to-seat chat server 110, synchronization module 112, satellite receiver 114, amenities manager 116, media database 118, transactions database 120, vessel inventory database 122, playlists database 138 and personalization server 140. Each of these components of system 100 is described further below. Also included in FIG. 1 is a user terminal 136, allowing access, e.g., via the Internet, by a user to ground system 132.

Note that in FIG. 1, only a single entertainment device 102 is depicted—this is purely for convenience of illustration. On-board system 101 includes multiple entertainment devices in communication with components of on-board system 101 and with each other as described further below.

Figure 2:
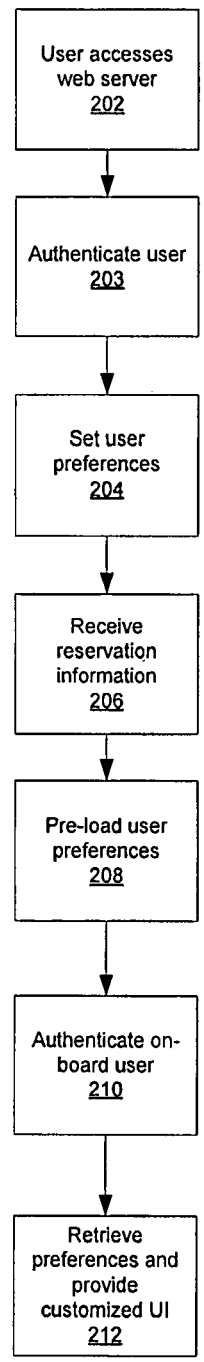
FIG. 2 illustrates a method for providing personalized services to passengers in accordance with an embodiment of the present invention.

FIG. 2 illustrates a method for providing personalized services to passengers in accordance with an embodiment of the present invention. To begin, a user accesses 202 web server 124 using a terminal 136 such as a home computer, PDA, mobile phone, etc. If the user is a returning user, he is authenticated 203 by authentication module 126; if he is a new user, he registers with system 100, and an account is established for him in user database 128. Next, the user sets 204 his preferences. In the case where the user is a returning user and already has established preferences, the user can edit those preferences as well.

Figure 3:
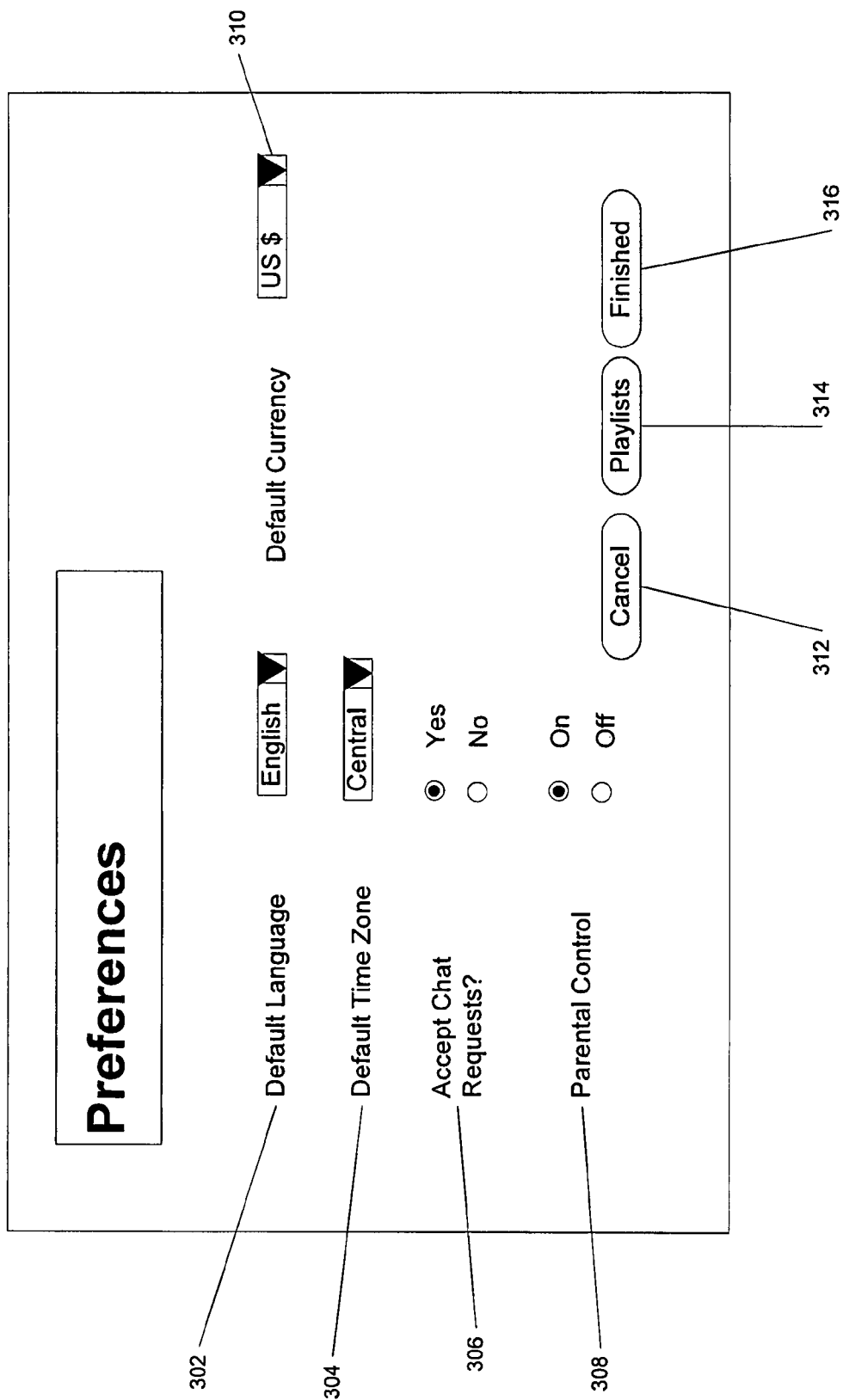
FIG. 3 illustrates an example user interface for setting user preferences in accordance with an embodiment of the present invention.

Many different preference settings may be established by the user. In one embodiment, and referring to FIG. 3, preferences include a default language selection 302; default time zone 304; accept chats 306; parental control 308; and default currency 310. The default language setting 302 controls the language in which the user interface of entertainment device 102 is displayed. The default time zone 304 setting controls which time zone is used to display content such as an in-flight program guide on entertainment device 102. The accept chat requests setting 306 controls whether other passengers aboard a vessel are able to initiate seat-to-seat chats with the user. The parental control setting 308 allows or restricts content designated as adult from being displayed on entertainment device 102. This might include, for example, movies rated for an adult audience. Default currency 310 specifies in which currency for-sale items such as food and catalogue items should be priced. Once the user has indicated his preferences, he can select a button to either cancel 312, set up playlists 314 or indicate that he is finished entering preferences 316. The user's set preference settings are stored in user preferences database 134.

Figure 4:
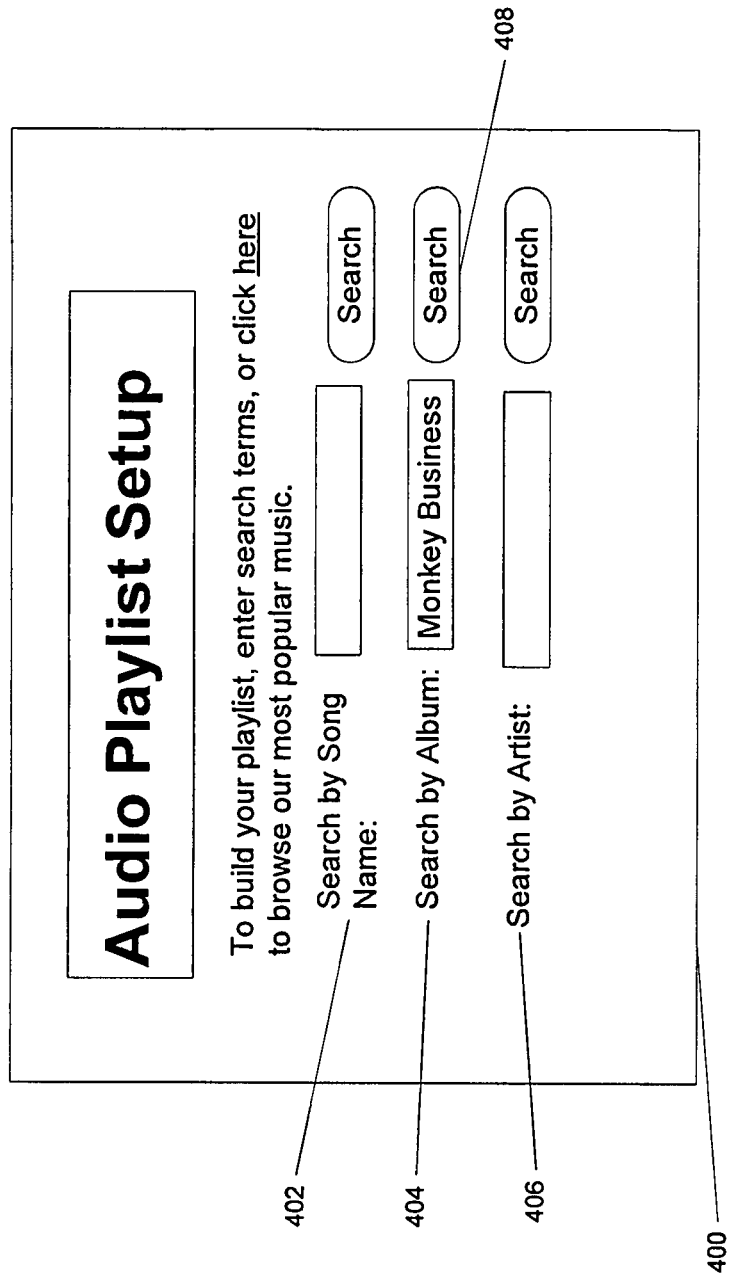
FIG. 4 illustrates a user interface page for creating an audio playlist in accordance with an embodiment of the present invention.

FIG. 4 illustrates a user interface (UI) page 400 of web server 124 for creating an audio playlist in accordance with an embodiment of the present invention. UI page 400 allows a user to search by song name 402, album name 404 or artist 406. In the illustrated embodiment, the user is about to execute a search for an album named "Monkey Business". To execute the search, the user clicks the appropriate "search" button 408.

Figure 5:
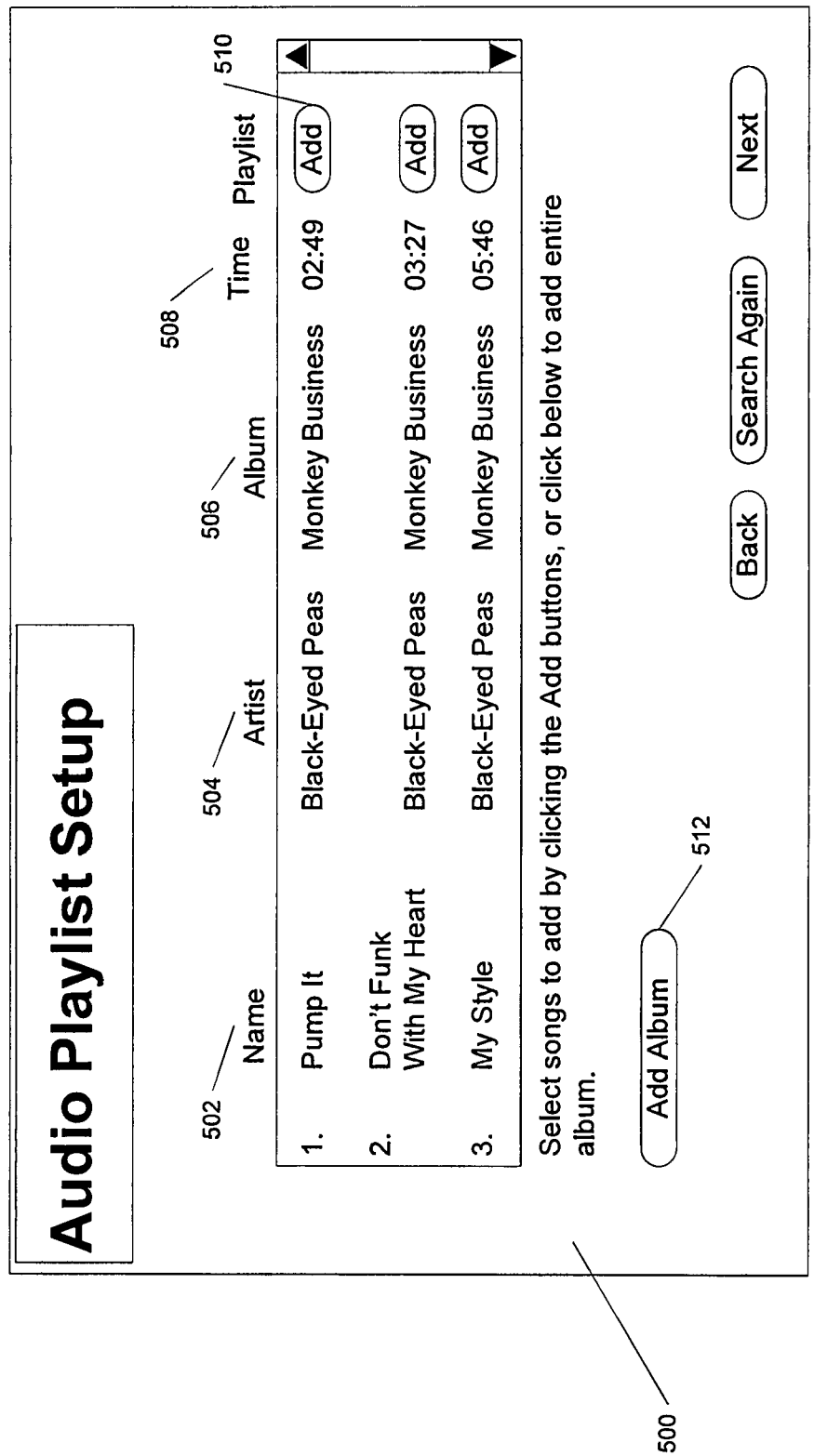
FIG. 5 illustrates a search results user interface page for creating an audio playlist in accordance with an embodiment of the present invention.

FIG. 5 illustrates a results page 500 showing results of the search for the "Monkey Business" album in accordance with an embodiment of the present invention. Results page 500 displays the name 502, artist 504, album 506, and time 508 for all tracks on albums containing the name "Monkey Business". Each result also includes an "Add" button 510. The user clicks the appropriate Add button 510 for each track he would like to add to the playlist. Alternatively, the user can click the "Add Album" button 512 to add all tracks on the album to the playlist.

Figure 6:
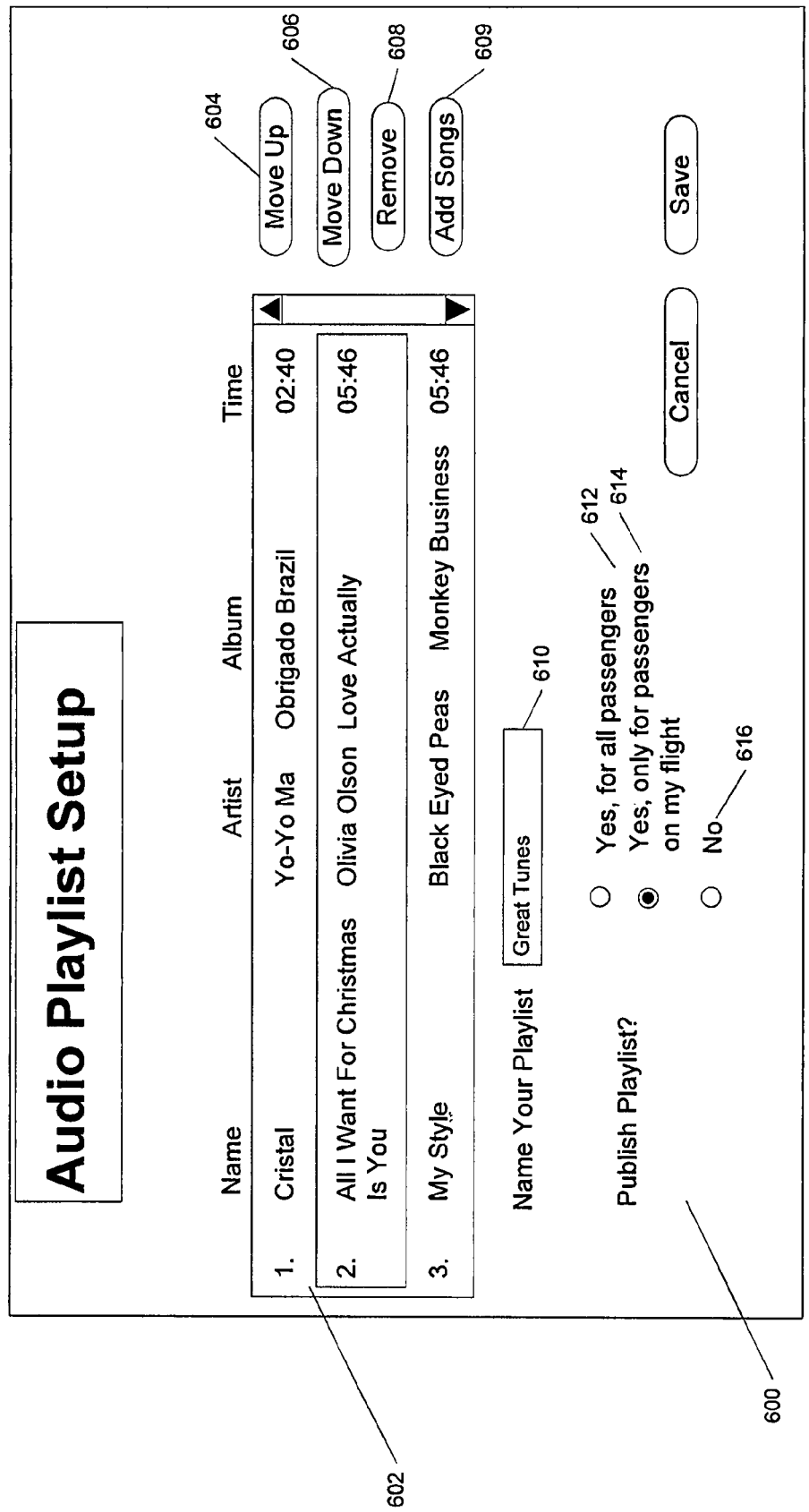
FIG. 6 illustrates a playlist editing page for editing playlist content in accordance with an embodiment of the present invention.

Once the user has added any desired tracks or albums from the results page to the playlist, and referring now to FIG. 6, a playlist editing page 600 is displayed. A playlist editing region 602 displays the current tracks in the audio playlist, including name, artist, album and time. By highlighting a track and selecting a move up 604 or move down 606 button, the order of the playlist is easily changed. A remove button 608 allows a track to be removed from the playlist; an "add more songs" button 609 allows the user to add additional songs to the playlist, e.g., via user interface page 400. The user can also name the playlist in field 610, particularly useful for publication or for instances in which a user has multiple playlists.

Playlist editing page 600 also allows the user to specify a publishing option for the playlist. In one embodiment, publishing options include publishing for all passengers 612, which allows access to the playlist by all passengers on all vessels associated with system 100; publishing only for passengers traveling on the same vessel as the user 614; and not publishing for anyone 616.

Figure 7:
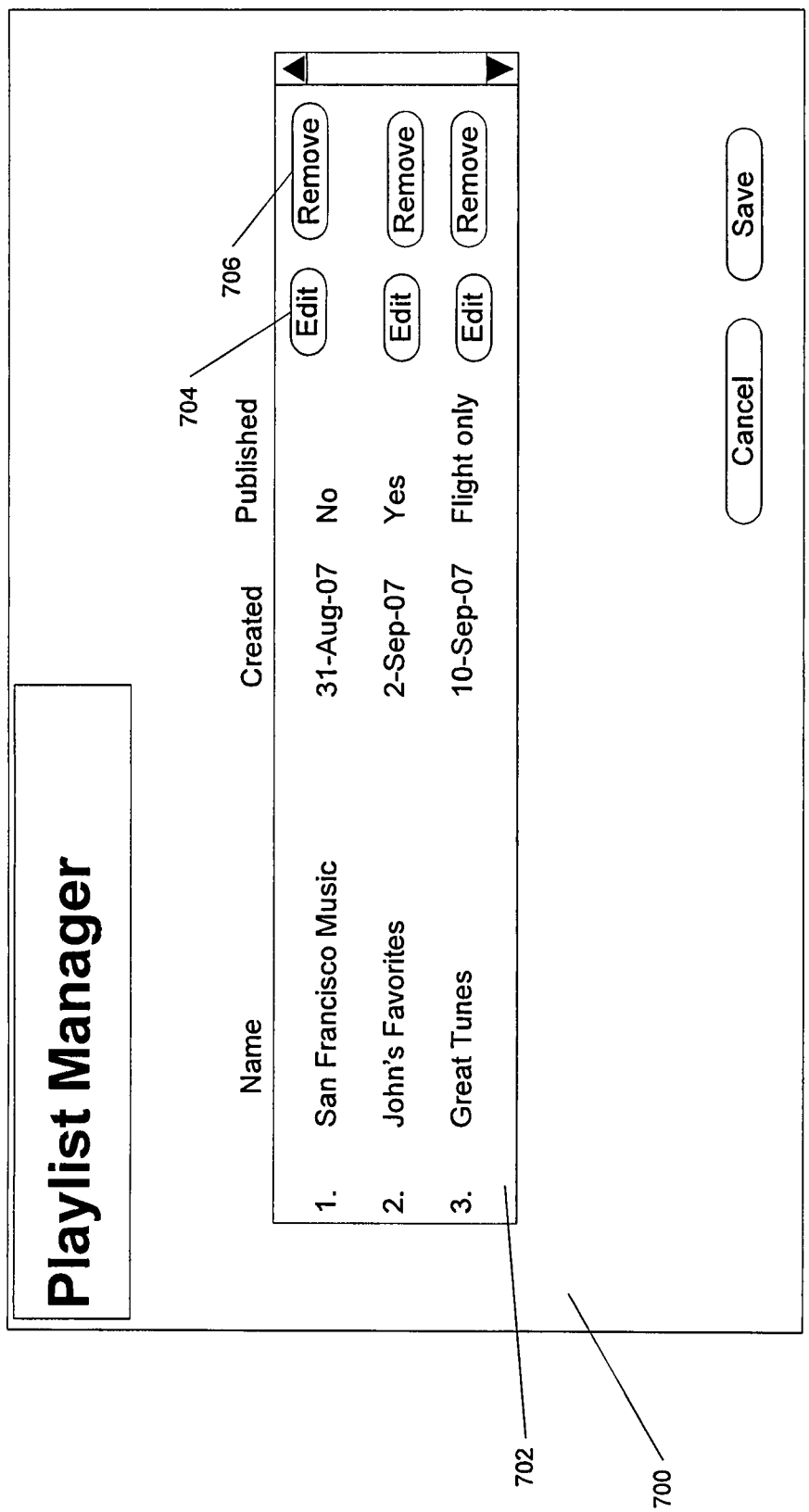
FIG. 7 illustrates a user interface for editing and removing playlists in accordance with an embodiment of the present invention.

Once the user has created the playlist and specified its publication settings, the playlist is stored in playlist database 136 and associated with the user's account in user database 128. Playlists can be displayed, edited and removed through a user interface 700 such as illustrated in FIG. 7. In FIG. 7, all playlists associated with the user are displayed in region 702, including their name, creation date, and publication setting. An edit button 704 allows the user to return to the playlist editing interface of FIG. 6, while a remove button 706 deletes the playlist.

Although the example illustrated above details the creation and editing of audio playlists, video playlists may be created in an analogous manner.

Returning to FIG. 2, once preferences and playlists have been established, the user makes a reservation 206 or otherwise secures passage aboard a vessel associated with system 100. The user's preference data is identified by cross-referencing the vessel reservation data or passenger manifest with user database 128. The cross-reference may involve simply matching the name of the user to names stored in user database 28, or may include using an affinity program identifier such as a frequent-flier number that is received from the user at booking time and additionally stored in user database 128 to allow cross-referencing. Alternatively, the user may use web server 124 to make his reservation, and provided he is authenticated by authentication module 126 the reservation can be automatically associated with his account in user database 128.

In one embodiment, user preference data is pre-loaded 208 to on-board system 101 prior to the user's voyage. In one embodiment, vessel communication server 130 is in communication with synchronization module 112 of on-board system 101, e.g., while an aircraft is on the ground, a ship is in port, etc. Communication may be effected using, for example, using the Terminal Data Loader (TDL) device from IMS of Anaheim, Calif., which supports wireless communication using 802.11, GSM or CDMA technologies. Alternatively, passenger data may be supplied on CD, DVD, tape, or another medium. Vessel communication server 130 provides a subset of user information from user database 128 corresponding to the passenger manifest; user preferences from user preferences database 134 corresponding to the subset of users; and any associated playlists from playlist database 136. Once the user preference data is made available to on-board system 101 it is stored in passenger database 142, user preferences database 108, and playlists database 138, respectively.

Figure 8:
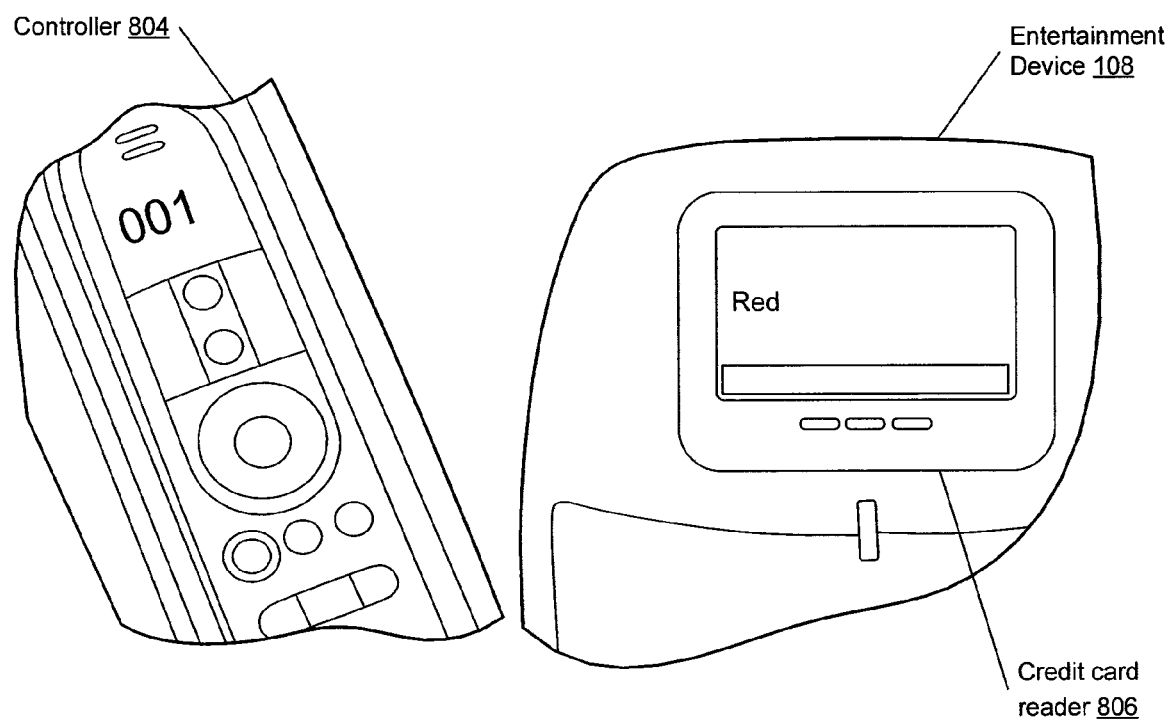
FIG. 8 illustrates an in-flight entertainment device and controller in accordance with an embodiment of the present invention.

Once on board the vessel, the user interacts with system 100 through entertainment device 102. FIG. 8 illustrates an example entertainment device 102 and its controller 804. In one embodiment, entertainment device 102 includes a touch screen and is mounted on the back of a seat, such as an aircraft seat or train seat. Alternatively, it may be stored in an armrest or in a fold-away position, such as to accommodate rows of seats that do not have other seats in front of them, or where the seat in front is too far to support easy use of an in-seat panel. In other types of vessels such as a ship, the panels may be mounted in staterooms, public areas, or designated entertainment areas of the ship. Controller 804 provides an additional method of input for entertainment device 102 in addition to the touch screen. In one embodiment, entertainment device 102 includes hardware such as the AVOD system by Panasonic adapted to execute software stored on a computer readable medium to provide the functionality described herein.

The user logs in 210 (FIG. 2) to on-board system 101 by providing a login name and optionally a password through entertainment device 102. Personalization server 140 authenticates the user's login information against passenger database 142, retrieves the user's preference data from on-board user preferences database 108, and retrieves the user's playlists from on-board playlists database 138. Personalization server 140 provides the retrieved personalization information to entertainment device 102, and entertainment device 102 displays 212 (FIG. 2) a user interface corresponding to the provided preferences. In one embodiment, a default profile is used for users who have not established an account, or who have established an account but not provided some or all of the available preference data.

Entertainment device 102 enables users to select from a variety of entertainment and service options. In one embodiment, and referring to FIG. 9, a user can select options on menu bar 902, including Watch 904, Listen 906, Play 908, Talk 910, Read 912, Eat 914, Shop 916, Kids Play 918, and Quicknav 920. In addition, menu bar 902 provides a button 922 for access to an information and help screen as well as a button 924 to access the media player interface.

Figure 10:
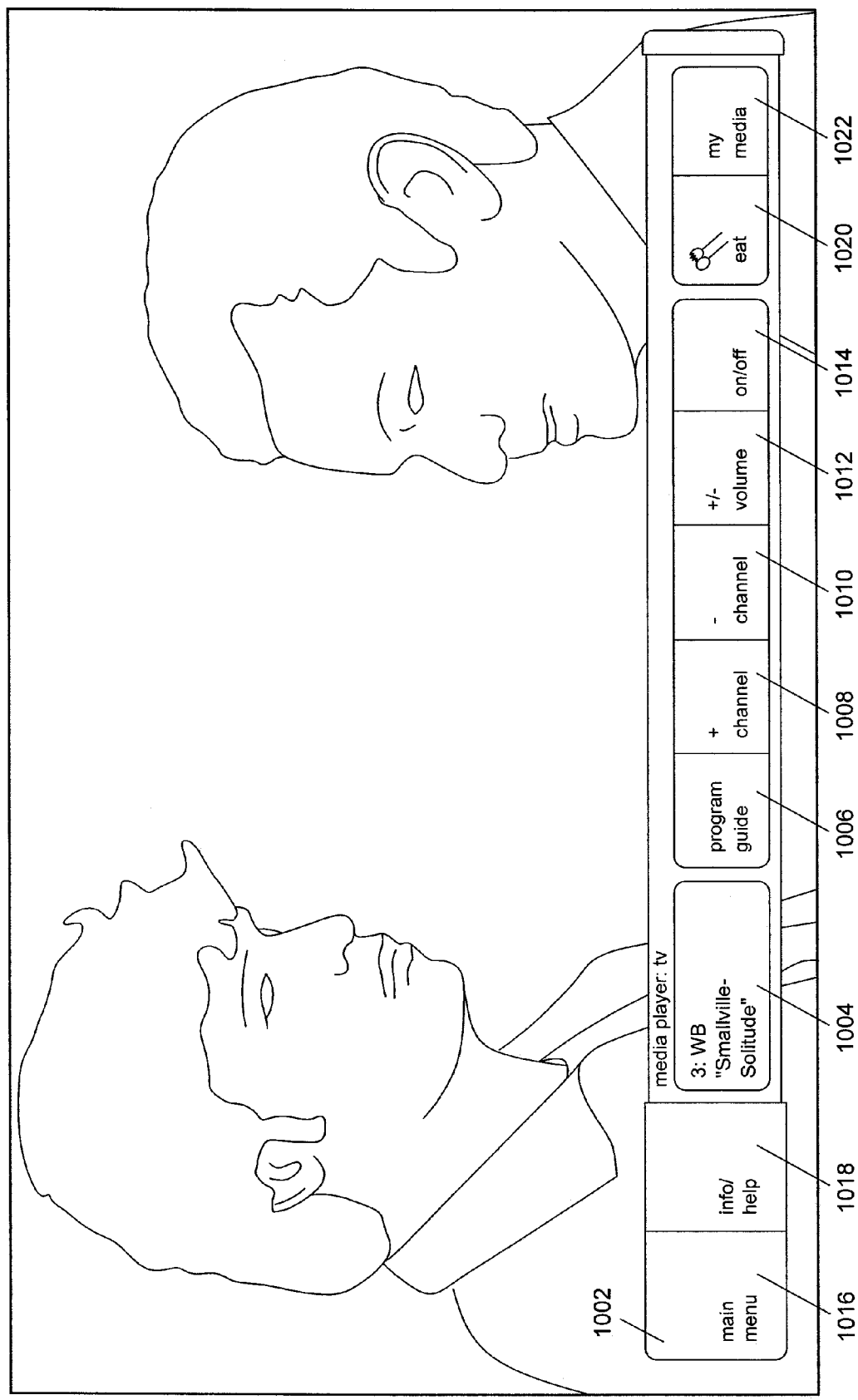
FIG. 10 illustrates an example of a menu bar for navigating functions of a media player in accordance with an embodiment of the present invention.

FIG. 10 provides an example of a menu bar 1002 displayed in response to activation of media player button 924. Menu bar 1002 displays information 1004 about the media currently being played, be it audio or video. A program guide button 1006 activates the program guide interface; channel up and channel down buttons 1008, 1010 allow selection of different audio or video programming; volume button 1012 allows volume adjustment, in one embodiment causing a pop-up window when activated (not shown), the pop-up window having a volume up and volume down button; and an on/off button 1014 for turning on or off the video content. Menu bar 1002 also displays a button 1016 for returning to the main menu 902, a button 1018 for activating the information and help menu, a button 1020 for displaying the meal ordering interface, and a button 1022 for accessing the personalized media menu.

Figure 11:
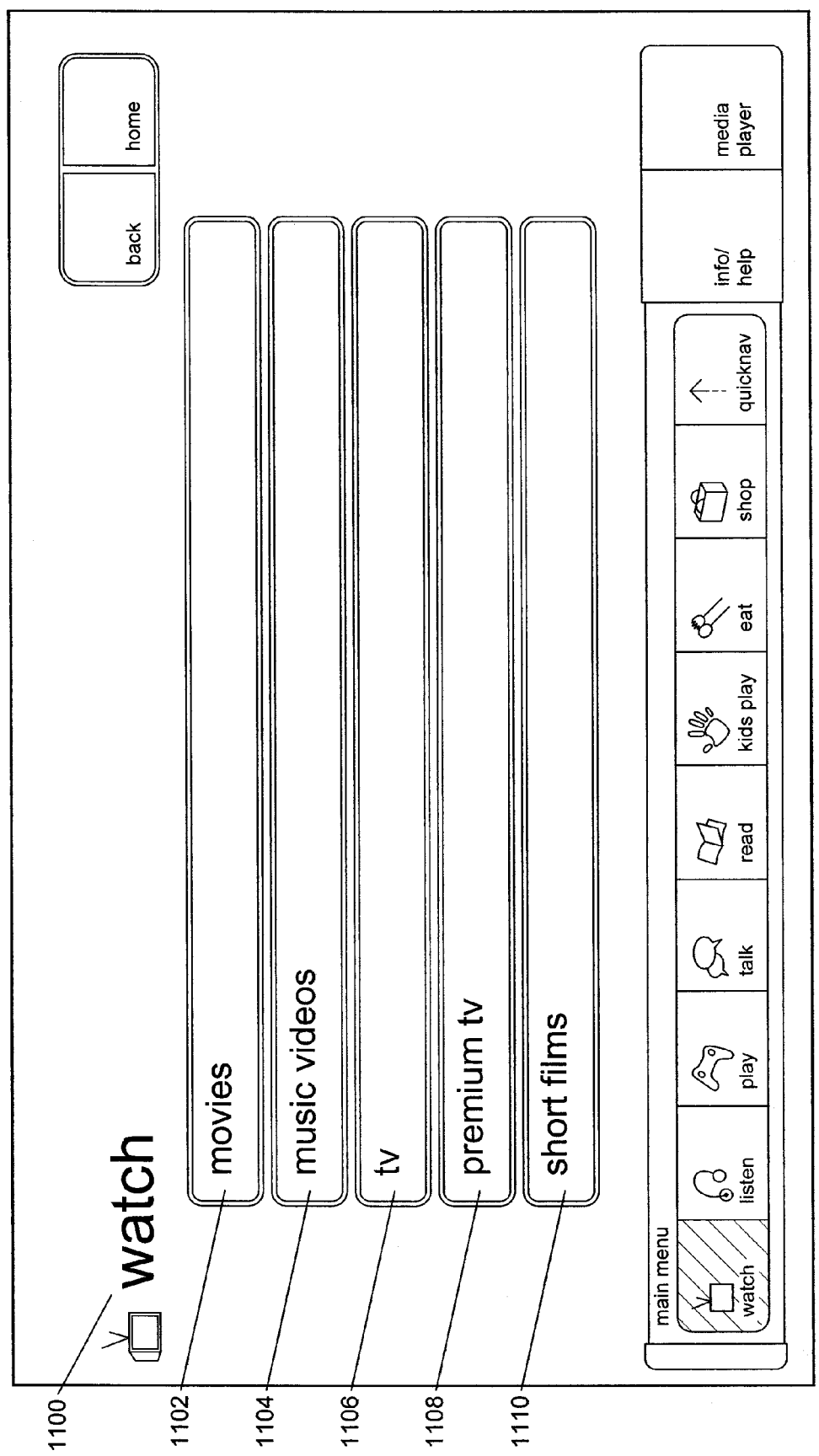
FIG. 11 illustrates an interface for selecting a type of video content in accordance with an embodiment of the present invention.

FIG. 11 illustrates an interface 1100 displayed in response to selection of watch button 904 (FIG. 9) in one embodiment. Interface 1100 provides options for watching movies 1102, music videos 1104, TV 1106, premium TV 1108, and short films 1110.

Figure 12:
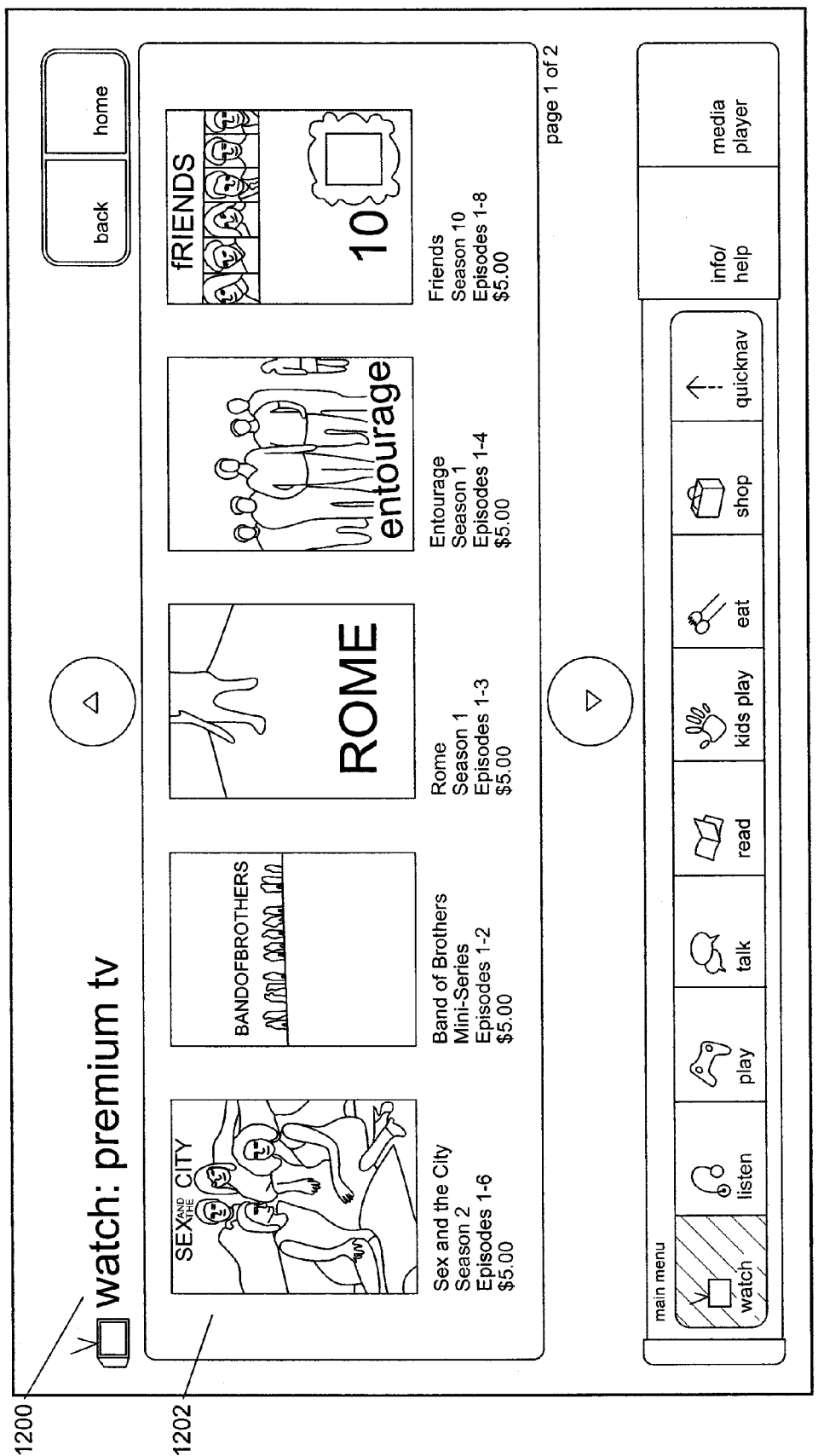
FIG. 12 illustrates an interface for displaying available video content in accordance with an embodiment of the present invention.

In one embodiment, movies, music videos, premium TV and short films represent content stored on media server 106. When a user chooses one of these options, a list of available content is displayed, and the user selects the content he wishes to view. For example, selection of the premium TV option 1108 displays an interface such as the interface 1200 illustrated in FIG. 12. Interface 1200 displays a scrollable list 1202 of premium TV available for streaming to entertainment device 102 from media server 106. In the illustrated case, title and episode information is displayed along with a price. When the user makes a selection of one of the TV programs, he is invited to swipe a credit card through credit card reader 806. A record of the credit card transaction is stored in transactions database 120, and media server 106 begins streaming the TV program to entertainment device 102.

In other embodiments, a fee is not charged for displaying content. One such alternative embodiment includes providing content free of charge to passengers in a premium cabin such as first class.

Selection of the movies 1102, music videos 1104 and short films 1110 options allows viewing of that content in a manner analogous to selection of premium TV. The selected content is then streamed from media server 106 to entertainment device 102, and any fees charged are stored in transactions database 120 for subsequent forwarding to ground system 132 via synchronization module 112.

On-board system 101 includes in one embodiment a satellite receiver 114 designed to receive television, radio and other transmissions from satellite broadcasters such as DISH Network by EchoStar Satellite L.L.C. and XM Satellite Radio. Selection of TV option 1106 allows a user to view broadcasts received by satellite receiver 114, i.e. to watch live television and listen to live radio broadcasts.

Figure 13:
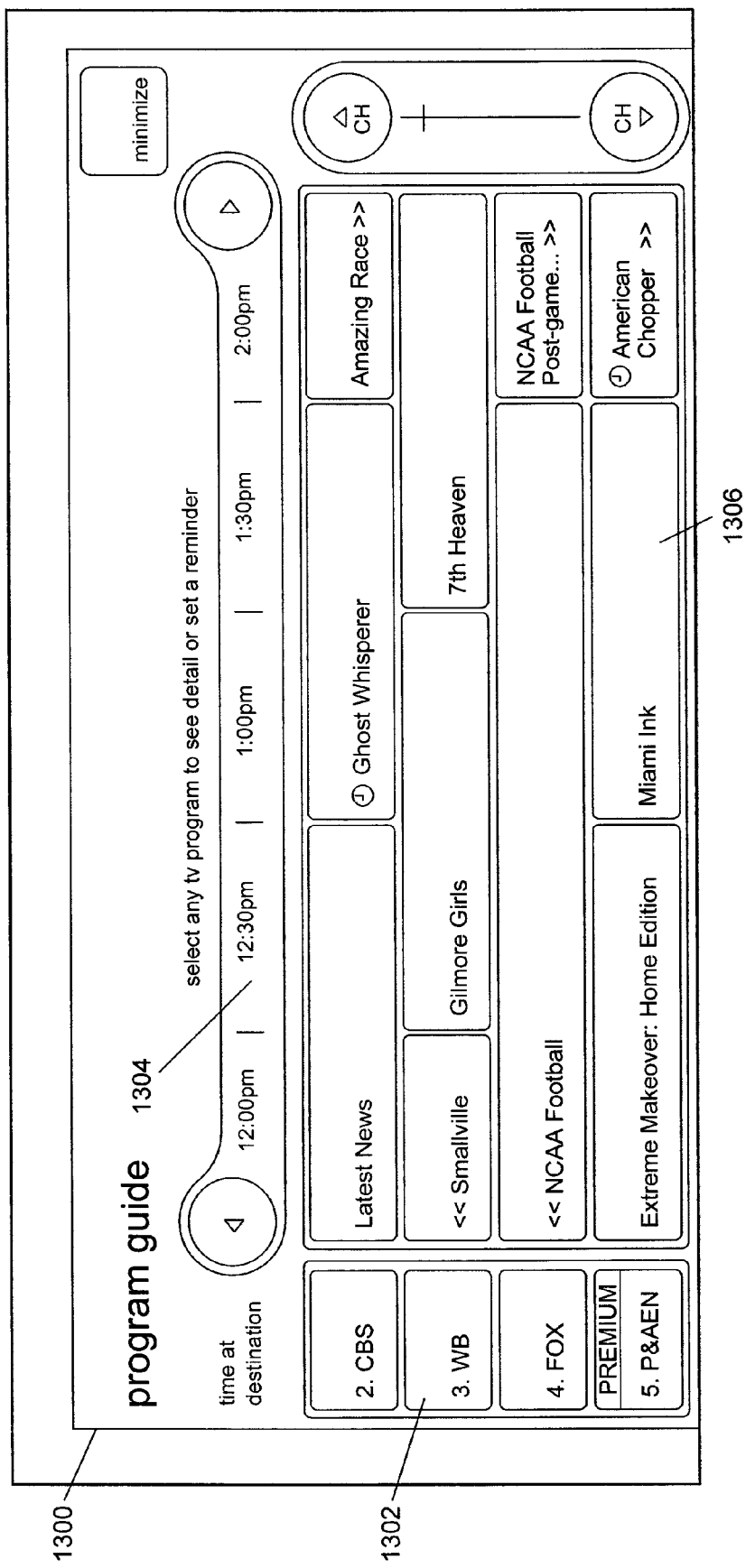
FIG. 13 illustrates an content programming guide in accordance with an embodiment of the present invention.

In one embodiment, and referring to FIG. 13, when a user selects the television option, a programming guide 1300 is displayed. The programming guide 1300 includes a list 1302 of channels available on board the vessel from satellite receiver 114, a time slot indicator 1304, and programs 1306 viewable on each channel during each time slot. In one embodiment, the time slot indicator 1304 indicates times according to the time zone specified in user preferences database 108 for the logged-in user. In one embodiment, the programming guide 1300 only displays time slots that correspond to the voyage of the vessel—for example, on an aircraft flight the programming guide displays only programs in time slots during which the flight will be in the air. Also in one embodiment, where the expected end of the voyage and the end of a time slot do not overlap, an indicator is placed in the program grid for those programs that will not be completed before the voyage ends. For example, the programs affected can be displayed in a different color; alternatively a vertical line or other indicator is overlaid on the grid.

Once the user has selected a program to watch from programming guide 1100, streaming of that programming begins.

Figure 14:
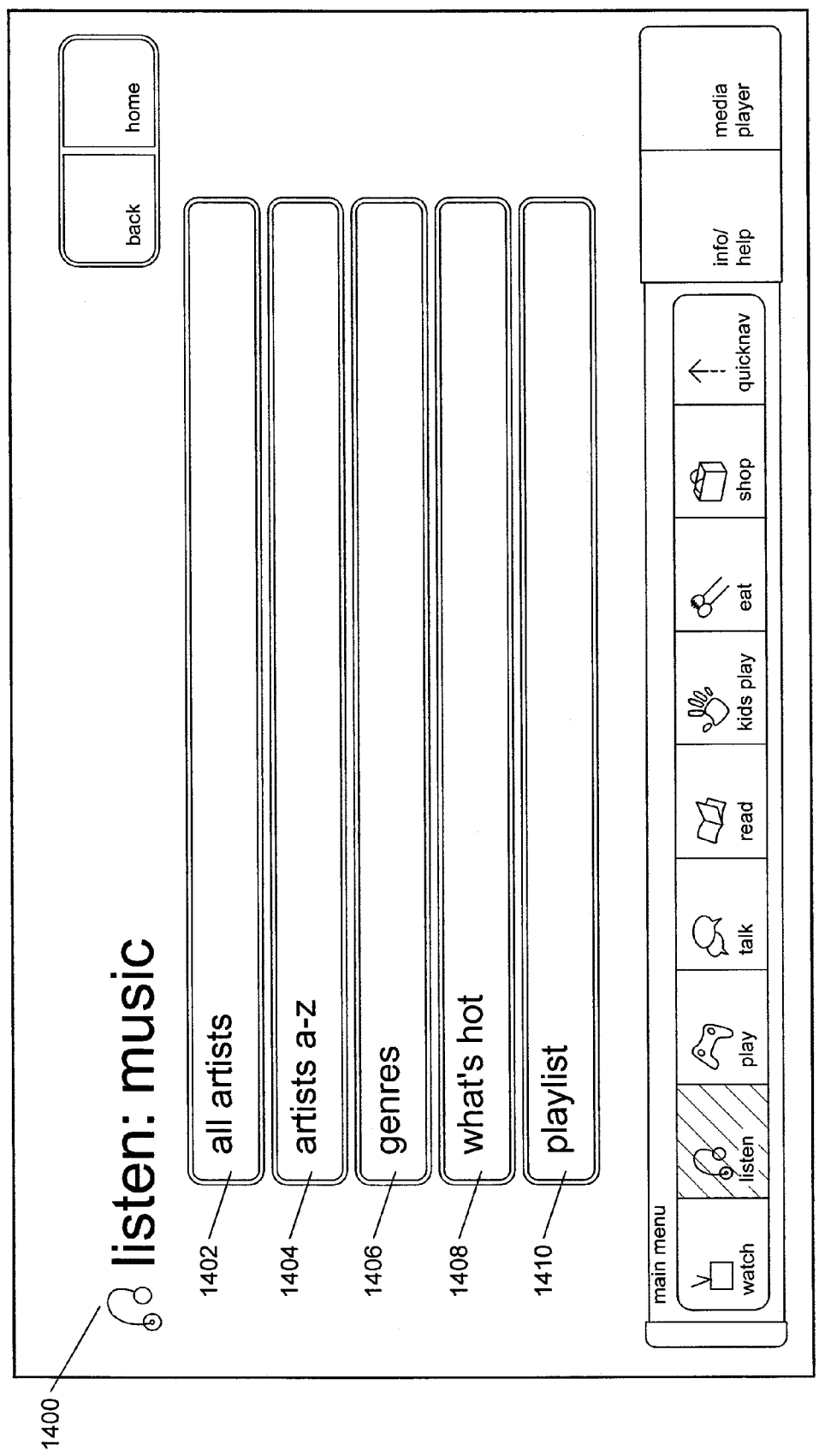
FIG. 14 illustrates an interface for selecting audio content in accordance with an embodiment of the present invention.

FIG. 14 illustrates an interface 1400 for listening to audio displayed in response to selection of the listen menu button 906. Interface 1400 allows a user to choose between selecting from all artists 1402, searching by the artists' alphabetical location 1404, selecting from a specific genre 1406, selecting from a list of popular audio content 1408, or playing a playlist 1410.

Figure 15:
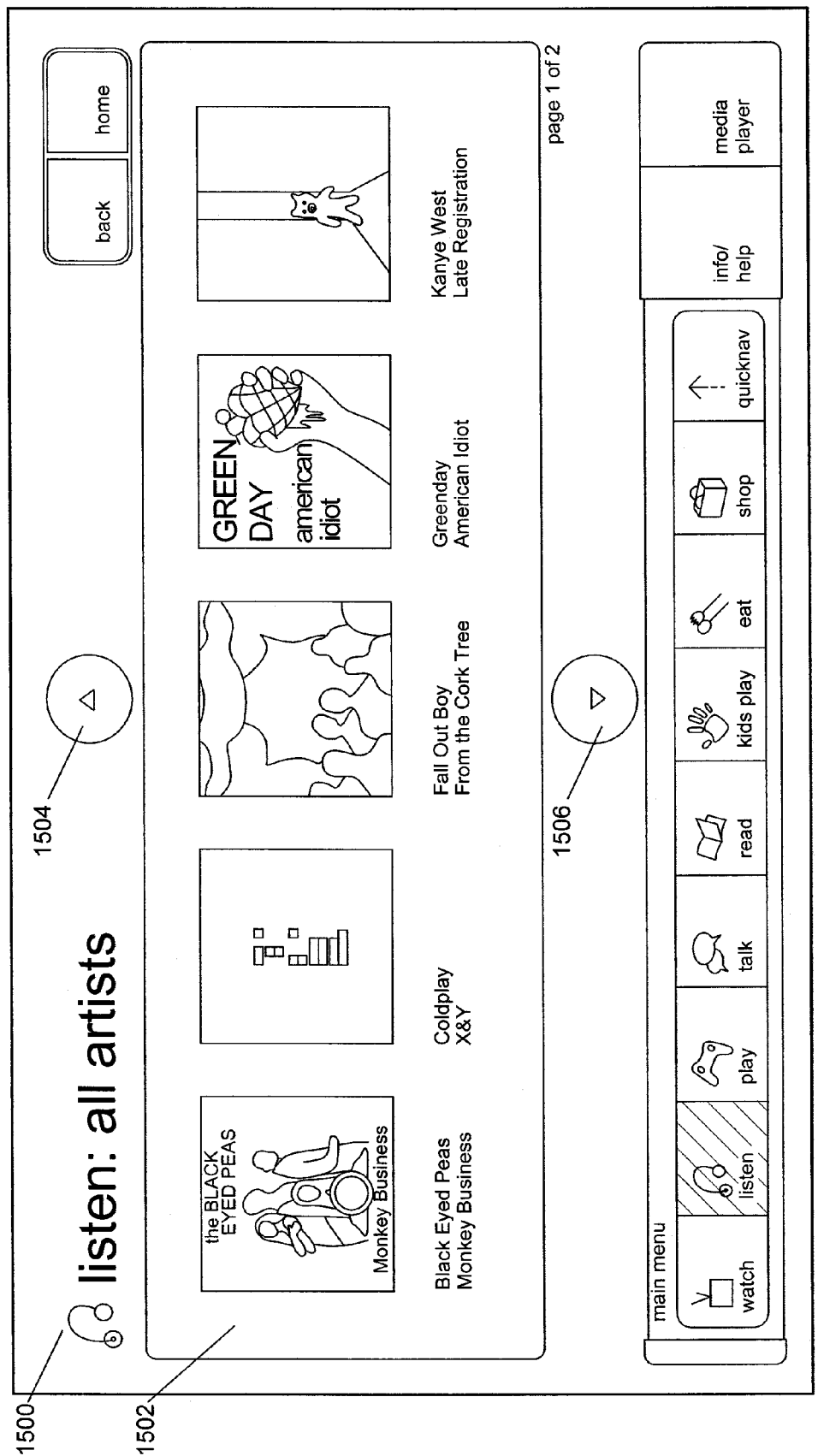
FIG. 15 illustrates an interface for displaying available audio content in accordance with an embodiment of the present invention.
Figure 16:
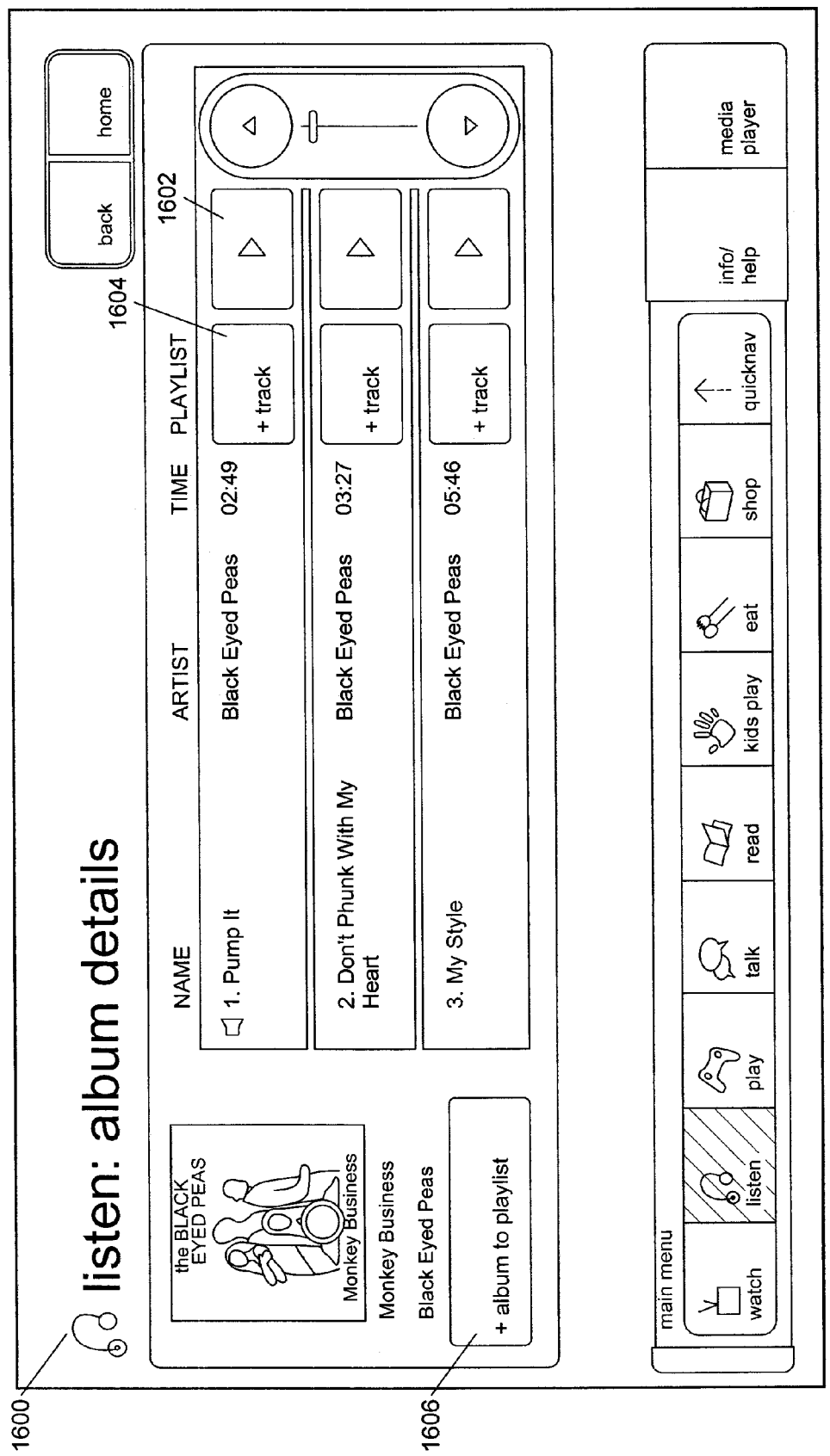
FIG. 16 illustrates an interface for displaying album information in accordance with an embodiment of the present invention.

Selecting the all artists option 1402 provides a user interface screen 1500 such as the one illustrated in FIG. 15. Interface 1500 includes a scrollable list 1502 of albums, each album listed by its artist name, album name, and a thumbnail image of the album. Those of skill in the art will appreciate that albums could be listed differently, or without thumbnails. By pressing the up 1504 or down 1506 arrows, additional albums can be listed. Selection of an album causes additional information the album to be displayed, including its track listings, as illustrated in FIG. 16. In user interface 1600, tracks can be played by pressing play button 1602 next to the desired song; alternatively, individual songs or the entire album can be added to a playlist by selection of button 1604 or 1606, respectively. The creation of playlists is described above with respect to FIG. 4, FIG. 5, FIG. 6, and FIG. 7.

Figure 17:
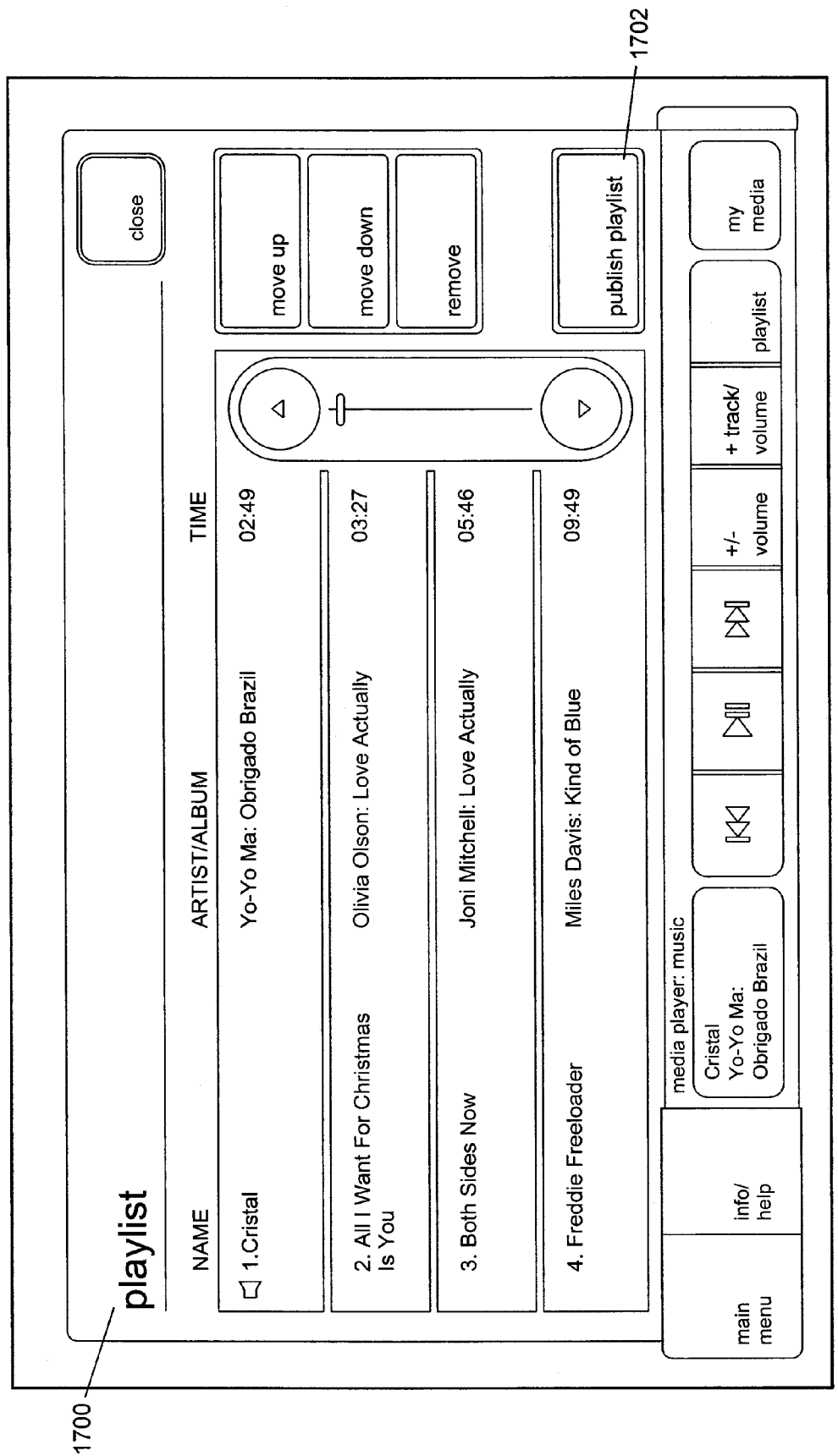
FIG. 17 illustrates an interface for editing a playlist in accordance with an embodiment of the present invention.
Figure 18:
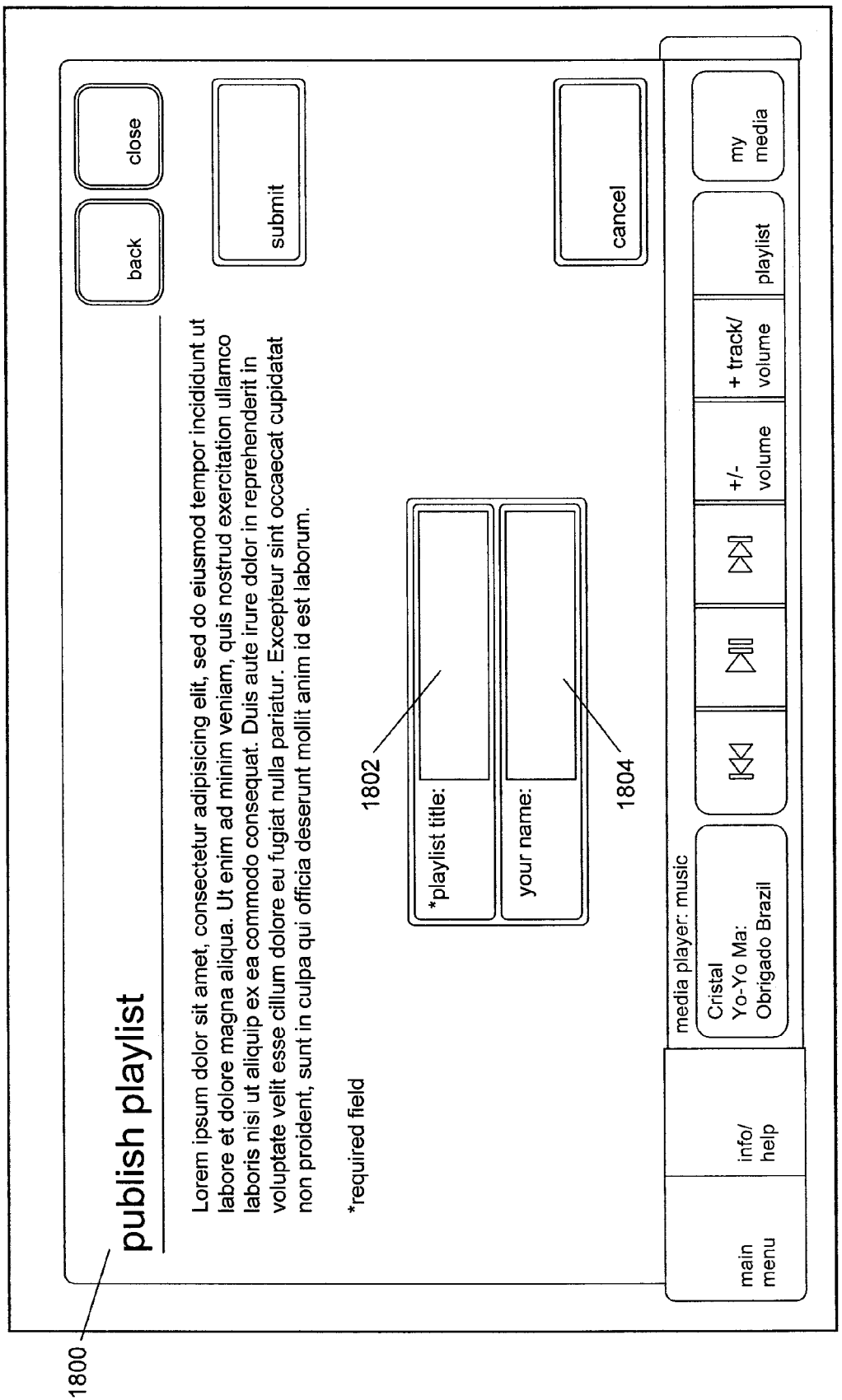
FIG. 18 illustrates an interface for publishing a playlist in accordance with an embodiment of the present invention.

FIG. 17 illustrates a playlist interface 1700 displayed in response to selection of playlist option 1410 (FIG. 14). Playlist interface 1700 is similar to the web-based interface described above with respect to FIG. 7. Selecting a publish playlist button 1702 causes publishing interface 1800 (FIG. 18) to be displayed. Using the publishing interface 1800, the user can provide a title 1802 and the user's own name 1804 for publication details. Once a user has published a playlist, it is available for viewing or listening by other passengers aboard the user's vessel, or aboard any associated vessels, depending on the privacy option selected. In embodiments in which the vessel does not have a real-time connection to ground system 132 and is not in synchronous communication with other vessels, playlist database 138 stores the new playlist and forwards it to ground system 132 when a connection is established.

Selection of play button 908 (FIG. 9) displays a user interface page from which a user can play a game stored on on-board system 101. In one embodiment, multiple passengers can play the same game against one another, with each entertainment device 102 playing the game communicating with one another via media server 106 to share game information. In one embodiment, passengers can use a game controller such as controller 804 to play games. Alternatively, they may use the touch screen of entertainment device 102.

Figure 19:
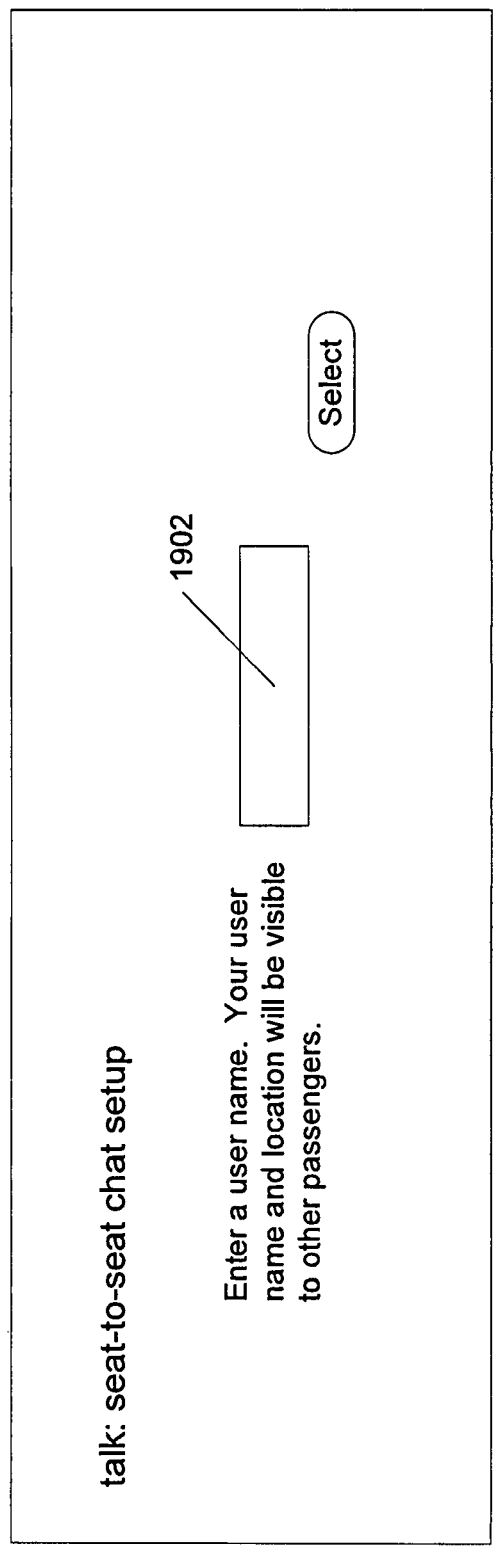
FIG. 19 illustrates an interface for setting up a seat-to-seat chat in accordance with an embodiment of the present invention.
Figure 20:
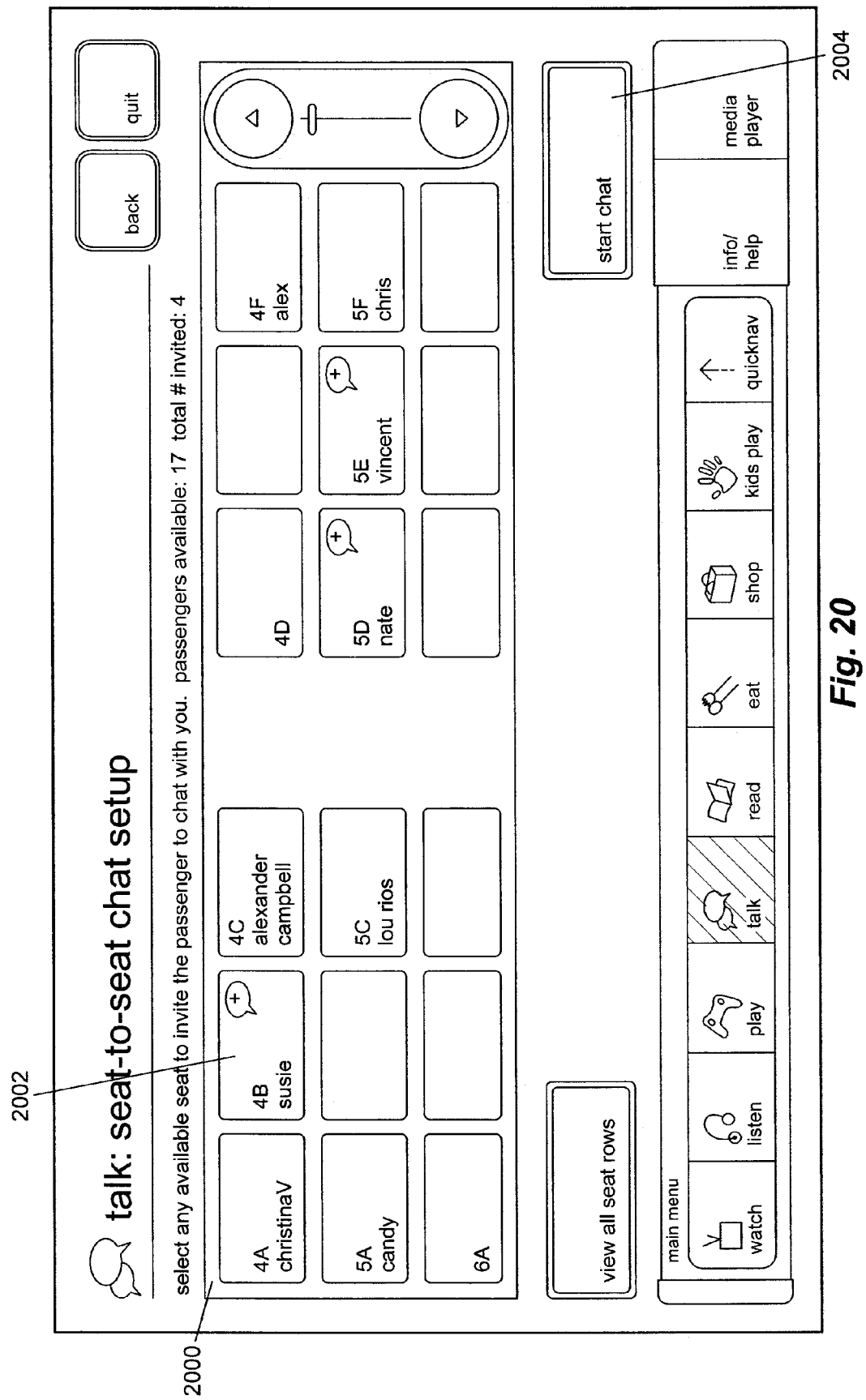
FIG. 20 illustrates a seat map for selecting participants for a seat-to-seat chat in accordance with an embodiment of the present invention.

Selection of talk button 910 allows the user to talk with other passengers aboard the vessel in real time. The chat may be either point-to-point or server-based, and may be between only two people, or between multiple participants. To begin, referring to FIG. 19, the user enters his chat nickname into field 1902. Next, turning to FIG. 20, a seat map 2000 is displayed to the user. The seat map indicates the location of other passengers who have made themselves available to engage in a chat, for example by setting their preferences as described above with respect to FIG. 3. For example, "christinaV" is in seat 4A, and "susie" is in seat 4B. By selecting the icon 2002 for susie, the user indicates that he would like to chat with her. In the illustrated case of FIG. 20, the user has selected "susie" in 4B, "nate" in 5D, and "vincent" in 5E. Note that in the illustrated embodiment, the passengers' locations are always displayed next to their names, as a safeguard against harassment or impersonation of others. After the user selects the passengers he would like to chat with, he clicks the "start chat" button 2004 to initiate the chat. Each invited passenger is alerted via their entertainment device 102 that the user has invited them to a chat, and each passenger may accept, decline, or block the user from inviting them again.

Figure 21:
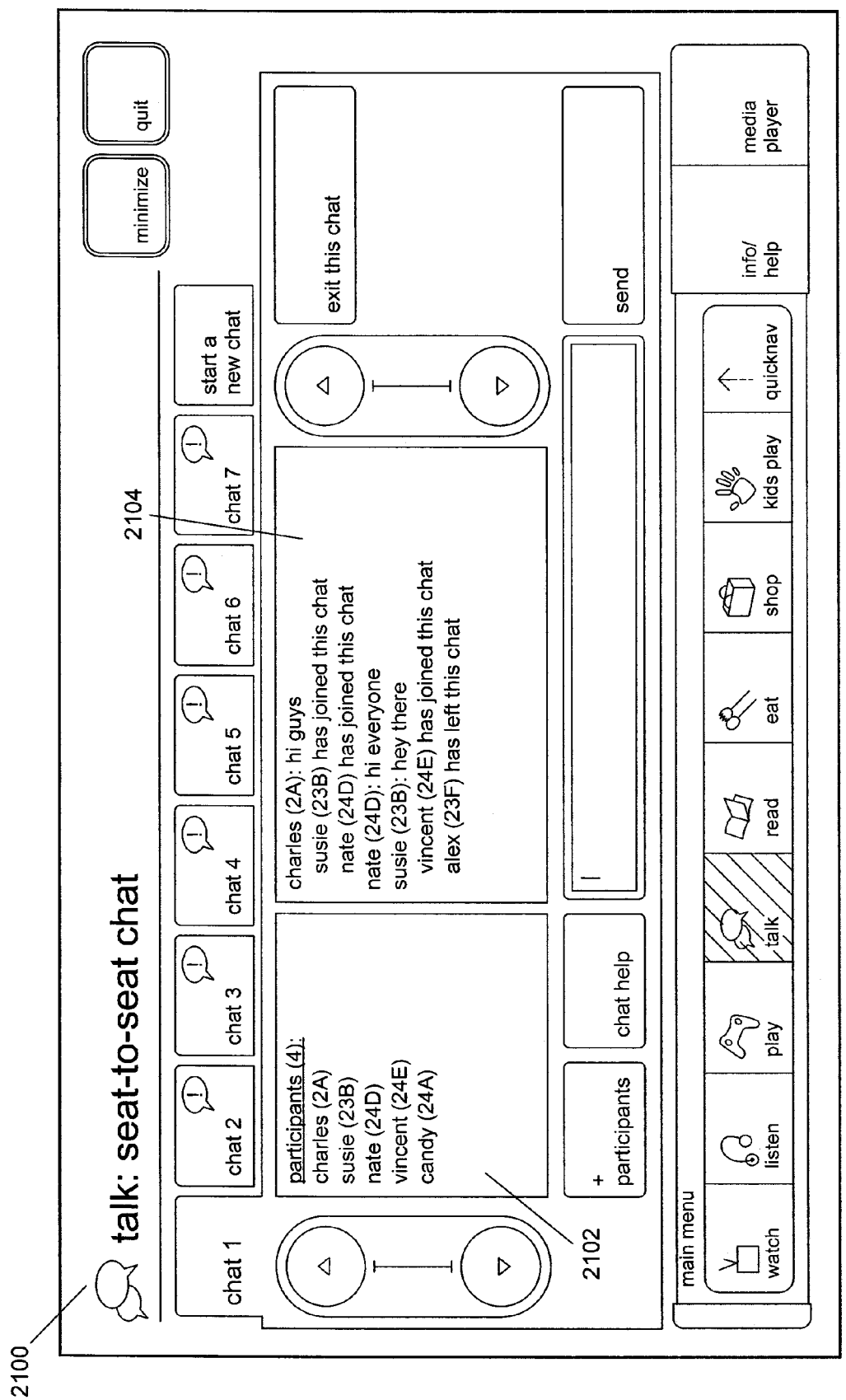
FIG. 21 illustrates a multi-session seat-to-seat chatting interface in accordance with an embodiment of the present invention.

FIG. 21 illustrates a multi-session seat-to-seat chatting interface 2100 in accordance with an embodiment of the present invention. One region 2102 of the interface shows a list of participants in the chat, as well as their location. In the illustrated embodiment, the vessel is a commercial aircraft, and the location of each passenger chatting is identified by seat number. The user user's own name is displayed in italics, or otherwise differentiated from the remaining participants' names, in one embodiment. Another region 2104 includes the text of the chat, including the name of the passenger authoring each transmission. Region 2104 also displays join and leave notices, indicating when a passenger has entered or left the chat room. A user may participate in multiple chat sessions simultaneously. In the illustrated case of FIG. 21, the user is participating in seven chats simultaneously, indicated as chat 1 through chat 7.

As noted, each passenger participating in the chat does so via his or her respective entertainment device 102. Each device is in communication with seat-to-seat chat server 110, which receives transmissions from each device and broadcasts the transmissions to the other participants in the chat. In an alternative embodiment, each entertainment device 102 is in direct contact with each other device 102, and the chat is carried out in a peer-to-peer manner.

Figure 22:
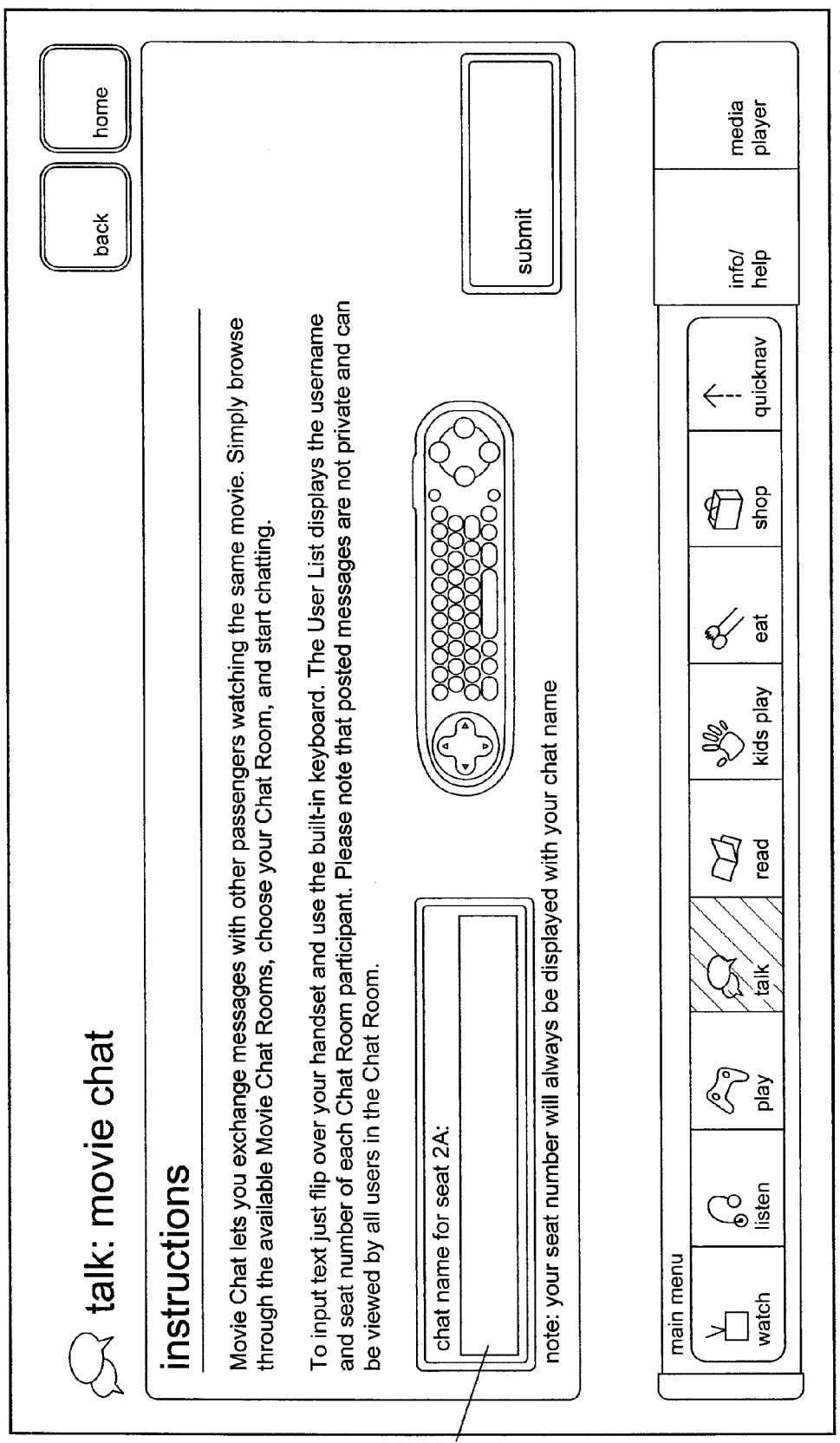
FIG. 22 illustrates a setup screen for a movie chat in accordance with an embodiment of the present invention.

System 100 also enables passengers to chat in chat rooms having dedicated topics. In one embodiment, all users watching the same video content or listening to the same audio content are able to join a chat room to discuss the video or audio content simultaneously. FIG. 22 illustrates a setup screen on which a user specifies his chat name for such a purpose in field 2202. Upon submitting a name, the user enters a chat room such as the one depicted above with respect to FIG. 21, but wherein the participants are those watching the indicated video or audio. In one embodiment, video content being discussed is displayed on a portion of entertainment device 102 simultaneously alongside the chat room application.

Figure 23:
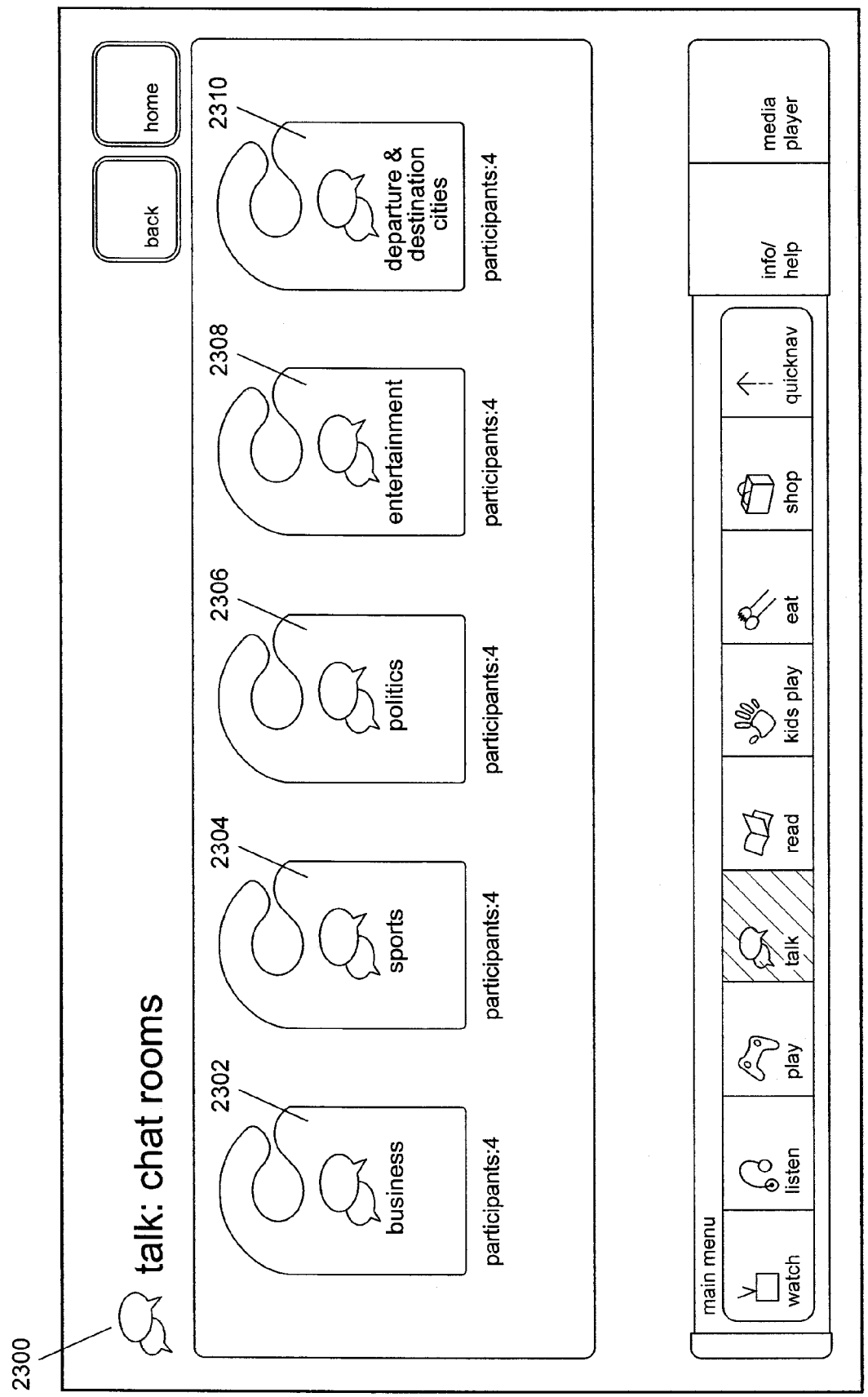
FIG. 23 illustrates a chat room selection screen in accordance with an embodiment of the present invention.
Figure 24:
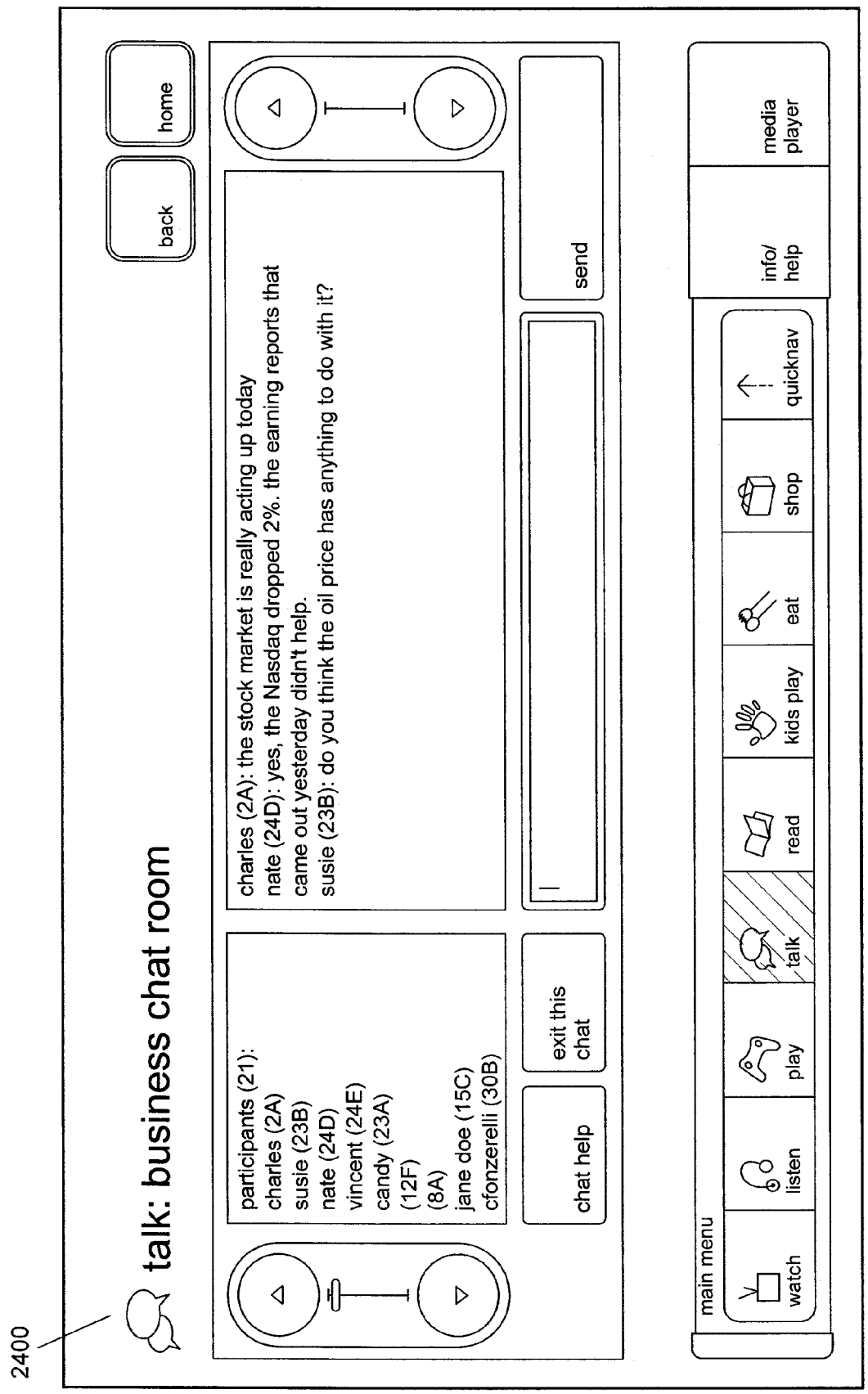
FIG. 24 illustrates a business-oriented chat room in accordance with an embodiment of the present invention.

In addition, passengers can join chat rooms directed to specific topics. FIG. 23 provides an example of a chat room selection screen 2300 that provides passengers with an opportunity to join chat rooms discussing business 2302, sports 2304, politics 2306, entertainment 2308, and departure/destination cities 2310 relevant to the vessel's voyage. The number of participants in each chat room is also displayed. Selecting one of the available chat rooms causes the user to enter the selected room to chat, such as through the user interface 2400 illustrated in FIG. 24 for a business-oriented chat room.

In one embodiment (not shown), where the vessel has a real-time link to a communications network such as the Internet, a sub-menu of talk button 910 allows a user to access web-based e-mail and other Internet resources.

Activation of the read button 912 (FIG. 9) enables the user to view online reading material such as novels, periodicals and newspapers. Newspapers and periodicals are in one embodiment pre-loaded to media server 106 prior to each voyage, or are updated periodically or in real time when the vessel has a connection to a server that provides the updates. In one embodiment, preferred reading materials are established by the user as preference data, and are stored in preferences database 134 and provided to on-board system 101 with other preference data as described above. In one embodiment, passengers can also access web sites and other networked locations as described above, where a real-time communications link exists with the network.

System 100 includes an amenities manager 116 and amenities module 104 to enable passengers to order amenities such as food, drink and shopping items through entertainment device 102 from real-time inventory on board the vessel.

Commercial operators of vessels such as aircraft and trains often offer food and beverage service to their passengers. Such meal service is typically offered on a periodic basis, for example mid-flight for airplane food service, and hourly for beverage service. A food and beverage cart is typically wheeled through the aisles of an aircraft to deliver to each passenger, taking up space and making it difficult for other passengers to move through the aircraft.

The on-board amenities system of on-board system 101 enables passengers to order the food and beverage of their choice from a real-time inventory listing, and to place the order at a time of their choosing. It also allows the aisles to remain free of service carts, since by fulfilling individual orders on demand, there is no longer any need to move through the aisles on a periodic schedule to determine whether any passenger wants any service item.

Figure 25:
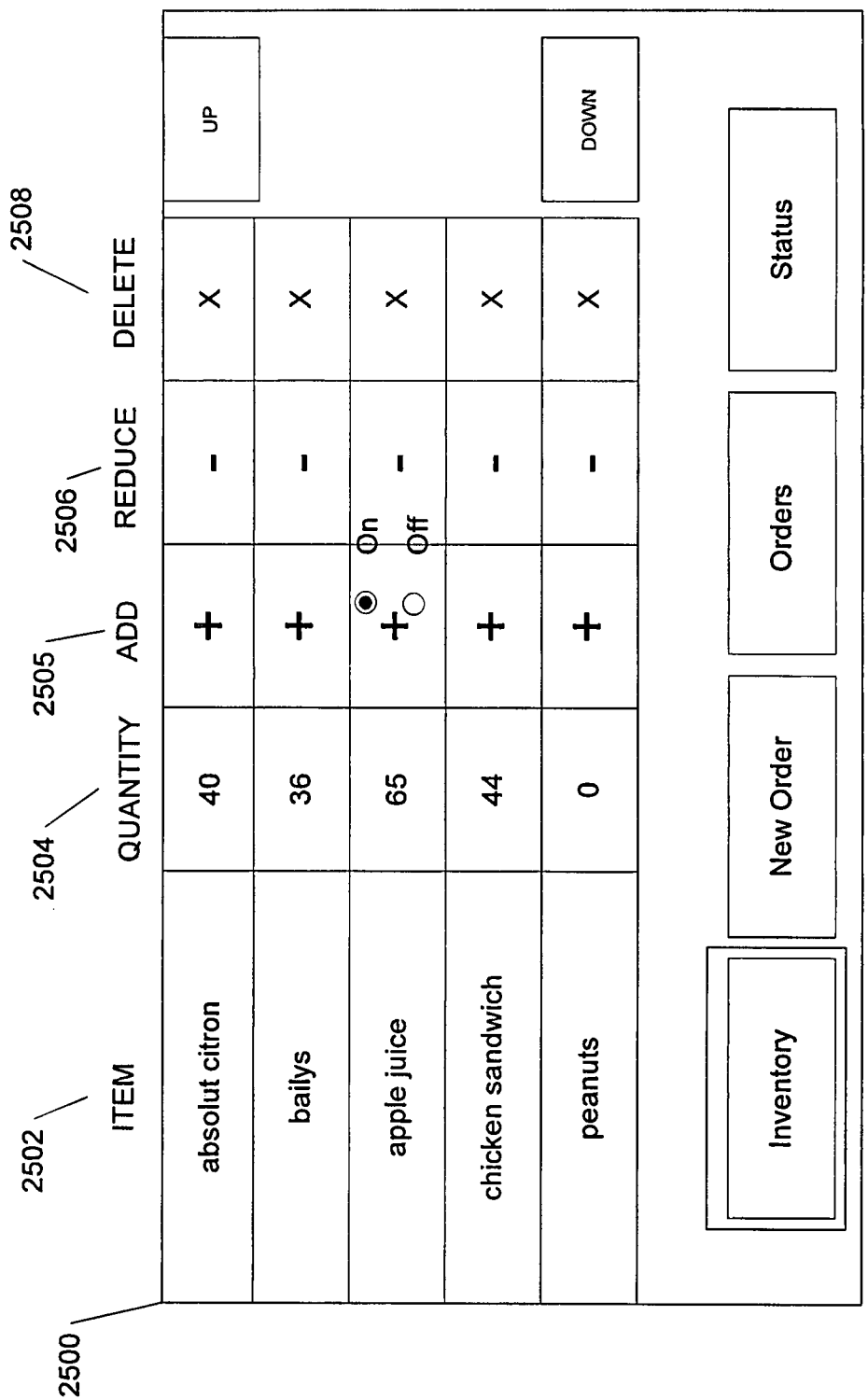
FIG. 25 illustrates an interface providing an inventory manager function of an amenities module in accordance with an embodiment of the present invention.

FIG. 25 illustrates an interface 2500 providing an inventory manager function of amenities module 104. Amenities module 104 in one embodiment is a tablet PC that is easily transported around the aircraft. Amenities module 104 may also be fixed to a location on the vessel, for example in the vessel's galley. Inventory manager 2500 includes a list of items 2502; a quantity 2504 for each listed item; and an add button 2505, reduce button 2506, and delete button 2508 for each listed item. Inventory manager 2500 is populated by amenities manager 116 with a list of items 2502 currently aboard the vessel, a record of which is stored in vessel inventory database 122, and the quantity 2504 of each of the items. For example, in the illustrated case, there are 44 chicken sandwiches on board the vessel. The inventory may be initially programmed by a crew member, or may be pre-loaded prior to the vessel's departure through synchronization module 112.

Figure 9:
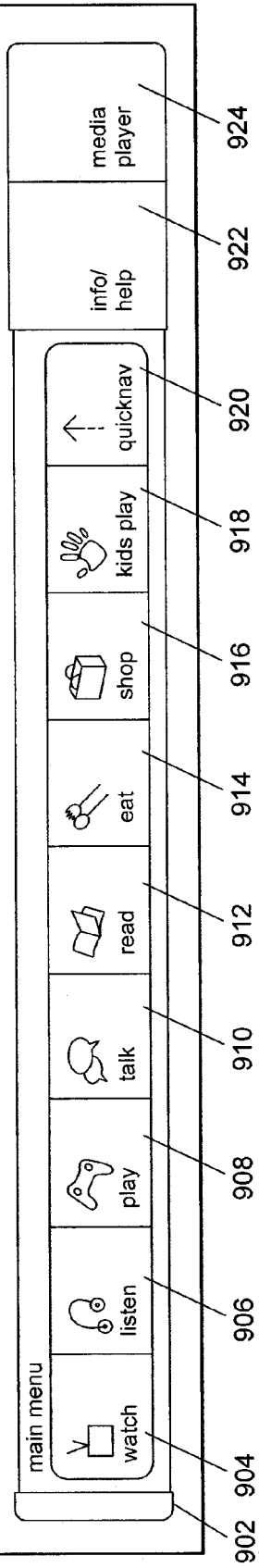
FIG. 9 illustrates a user interface including a navigation menu bar in accordance with an embodiment of the present invention.
Figure 26:
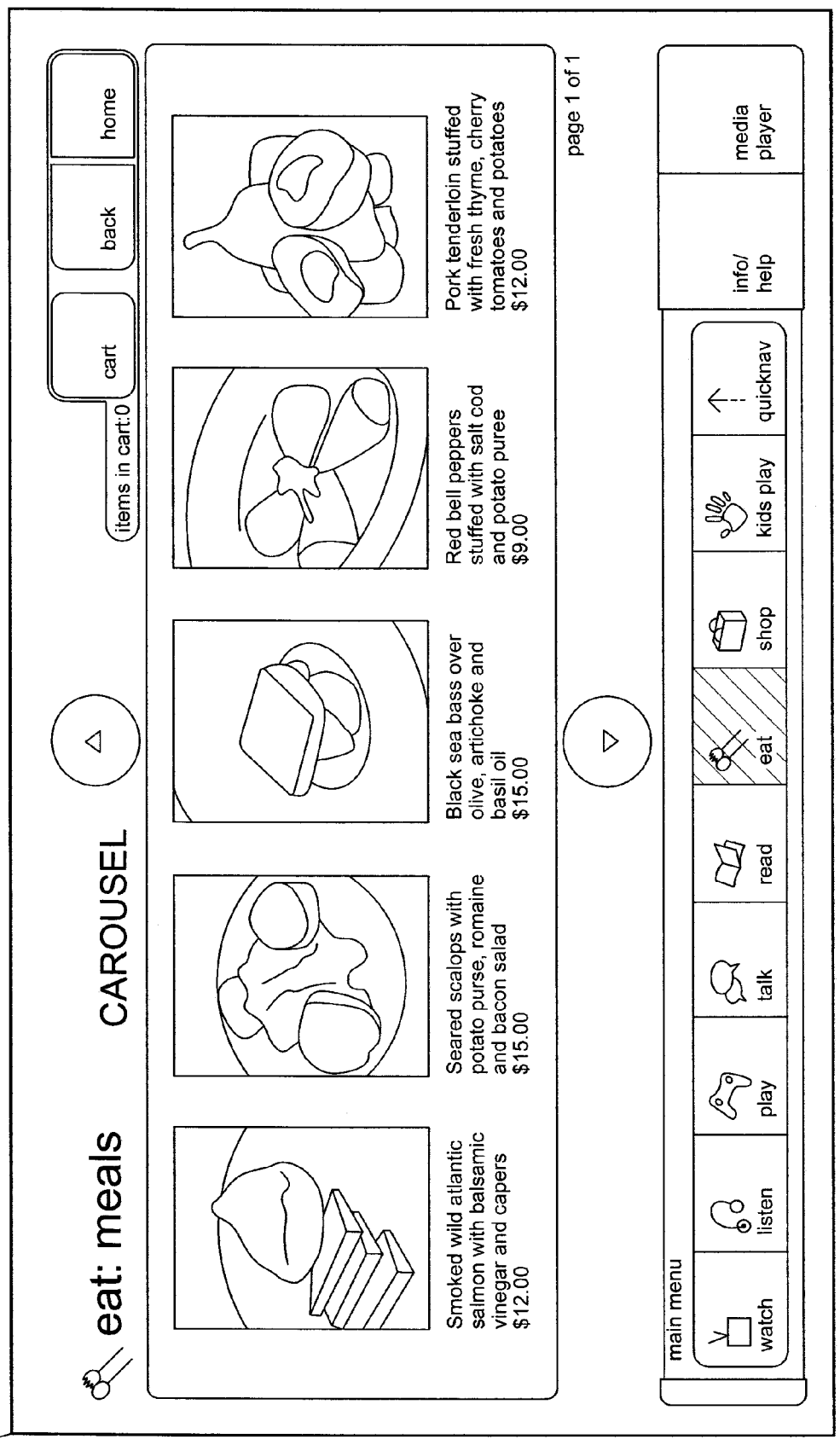
FIG. 26 illustrates a selection menu for selecting food and beverage items in accordance with an embodiment of the present invention.

Passengers interact with amenities manager 116 through their entertainment device 102 by selecting the eat button 914 (FIG. 9). FIG. 26 illustrates a selection menu 2600 for selecting food and beverage items to order. As a user scrolls through the list of available items, each item is displayed along with a description and price, if appropriate. Any item can be added to an order, also known as a cart, by simply touching the item on the screen. In one embodiment, entertainment device 102 receives the list of available items from amenities manager 116, so that the items displayed to users reflect only the actual inventory on the vessel at that moment.

Once the user has selected all of the desired items and placed them into his cart, an order review and completion screen (not shown) allows the user to review the order and to submit it for fulfillment. In one embodiment, a fee is charged for some or all of the items available, and the user swipes a credit card through credit card reader 806 as part of the ordering process. Alternatively, the user may pay using cash when the order is fulfilled.

Once an order has been submitted, it appears on an order fulfillment screen 2700 of amenities module 104, an embodiment of which is illustrated in FIG. 27. In the illustrated embodiment, each order is given an ID 2702, and its location 2704, order time 2706, and status 2708 are also displayed. From the order fulfillment screen 2700, an attendant such as a crew member can activate a button to indicate that the order is complete 2710, canceled 2712, or can view the order details 2714. FIG. 28 provides an illustration of a detailed order view 2800 that is displayed in response to activation of button 2714. In the illustrated case, the passenger located at seat 14D has ordered a breakfast selection, a Beck's beer, a Heineken, and a glass of cabernet sauvignon wine, totaling $19. Returning to FIG. 27, the attendant readies the ordered items and by pressing button 2710 informs amenities manager 116 that the order is complete. Amenities manager 116 automatically decrements the available inventory of the ordered items, and removes from display on interface 2600 any items that are no longer available. Transaction information is stored in transactions database 120 for later forwarding, e.g., to a credit card billing system other data warehouse as desired. Through interface 2700, an attendant can also create an order using new order button 2716, which can be useful for example when a passenger approaches the galley and requests an item, rather than placing the order through entertainment device 102. Allowing entry of the order by the attendant ensures that amenities manager 116 has an accurate account of the vessel's inventory.

The same approach taken with respect to food and drink is also used to enable an on-board shopping experience. When the user selects the shop button 916, a list of items available on board the vessel for purchase is provided. Each desired item can be added by the user to his cart, and at checkout, amenities module 104 notifies an attendant that a shopping order needs fulfillment. Again, amenities manager 116 tracks the available inventory of each displayed item in real time, decrementing as appropriate.

In one embodiment, entertainment device 102 can be used by a passenger to indicate a special meal type. For example, a preference configured by the user either in advance or at entertainment device 102 can specify that the user wishes to see only kosher options. In this embodiment, food listing 2600 includes only kosher products.

Kids play button 918 provides an interface for younger passengers to have an entertainment experience suitable for their age. Age-appropriate audio and video content selection options are provided as sub-menus, as described above for general video and audio selections. A user may also select children's' games from the kids play menu.

Figure 29:
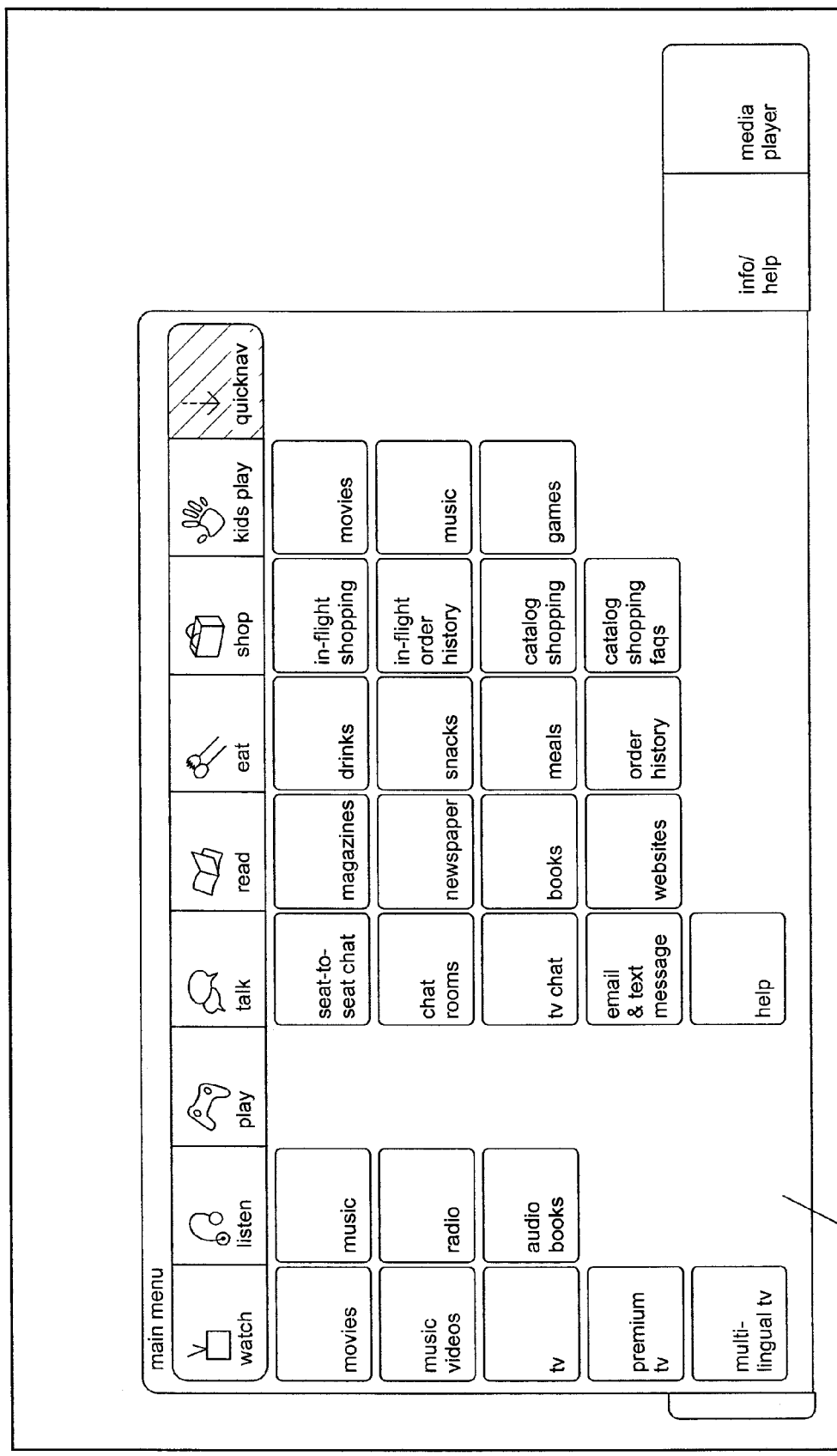
FIG. 29 illustrates an example of a navigation screen on an entertainment device in accordance with an embodiment of the present invention.

Referring to FIG. 29, quicknav button 920 provides an immediate overview 2900 of functions available on entertainment device 102, sorted by top-level function. By selecting a button directly from quicknav screen 2900, a user can navigate quickly to a desired function.

Info/help button 922 provides a sub-menu (not shown) with links to help request features, for example with instructions on how to use the various features of entertainment device 102. In one embodiment, a real-time map is also available, showing the vessel's current location, track, and additional geographic information.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of synchronization module 112, amenities manager 116, authentication module 126, and so forth may be provided in many or one module.

Some portions of the above description present the feature of the present invention in terms of algorithms and symbolic representations of operations on information. These algorithmic descriptions and representations are the means used by those skilled in the entertainment system arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A method for providing service items to an aircraft passenger, the method comprising:
   receiving, by at least one computer aboard an aircraft, passenger manifest data for a flight;
   receiving, by the computer aboard the aircraft, passenger preference data received from passengers on the flight prior to embarkation aboard the aircraft;
   receiving, by the computer aboard the aircraft, inventory information describing available food and beverage items aboard the aircraft, the inventory information including an available quantity of each item;
   identifying, by the computer from the received passenger preference data, passenger preference data for a first passenger, the passenger preference data indicating a special meal type for the first passenger;
   displaying to the first passenger aboard the aircraft on a first entertainment device a plurality of menu options, the menu options including an entertainment option and a food ordering option;
   receiving from the first passenger at the first entertainment device a selection of the food ordering option;
   responsive to the selection of the food ordering option, displaying on the first entertainment device a description of the available food and beverage items associated with the special meal type indicated for the first passenger, at least some of the items having a displayed associated cost;
   receiving, at the first entertainment device, a request from the first passenger for one of the displayed food or beverage items;
   receiving, at the first entertainment device, payment from the first passenger of the cost associated with the requested food or beverage item;
   responsive to receiving the payment from the first passenger, displaying on an amenities module a description of the requested item and a seat location of the first passenger;
   receiving, at the amenities module, an indication that the requested item has been delivered to the first passenger in response to the displaying on the amenities module of the description of the requested item;
   responsive to receiving the indication that the requested item has been delivered, decrementing the available inventory of the requested food or beverage item; and
   displaying on a second entertainment device accessible to a second passenger a description of the available food and beverage items, wherein responsive to a determination that the available inventory of the item requested by the first passenger is zero, the description of the available food and beverage items displayed to the second passenger does not include the item requested by the first passenger.

2. The method of claim 1 wherein the amenities module includes a plurality of input buttons for receiving entry of new requests for food and beverages, and further comprising:

receiving at the amenities module a selection of an input button enabling entry of new requests for food and beverages;

receiving via an order fulfillment screen input specifying order information for a second request for food and beverages;

receiving via the order fulfillment screen input indicating that the second request has been completed; and updating the stored inventory information based on the second request.

3. The method of claim 2 further comprising:

receiving via the order fulfillment screen input for viewing additional order information; and displaying an order details screen including, for each item in the received request, a quantity, description, price, and subtotal.

4. The method of claim 1 wherein at least some of the described food and beverage items are available at no cost.

5. The method of claim 1 wherein the amenities module is a tablet PC.

6. The method of claim 1 wherein the amenities module is fixed to a galley of the aircraft.

7. An aircraft entertainment system comprising:

a vessel inventory database including inventory information describing available food and beverage items aboard an aircraft, the inventory information including an available quantity of each item, and pre-loaded with initial inventory information prior to departure of the aircraft on a flight;

a passenger database, coupled to the vessel inventory database, and including passenger manifest data for the flight;

a user preferences database, coupled to the passenger database, for storing passenger preference data received from passengers on the flight prior to embarkation aboard the aircraft, the passenger preference data indicating a special meal type for at least some of the passengers on the flight;

a plurality of entertainment devices aboard the aircraft, the plurality including a first entertainment device configured to:

display a plurality of menu options, the menu options including an entertainment option and a food ordering option;

receive from a first passenger at the first entertainment device a selection of the food ordering option;

responsive to the selection of the food ordering option and user preference data indicating a special meal type for the first passenger, obtain from the vessel inventory database the information describing the available food and beverage items aboard the aircraft and display at least a portion of the information on the first entertainment device according to the special meal type, at least some of the items having a displayed associated cost;

receive a request from the first passenger for one of the displayed food or beverage items and payment of the cost associated with the requested food or beverage item; and responsive to receiving the payment from the first passenger, providing to an amenities module a description of the requested item and a seat location of the first passenger;

the amenities module, coupled to the plurality of entertainment devices, adapted to:

display indicia of the requested item including the seat location of the first passenger;

receive an indication that the requested item has been delivered to the first passenger in response to the displayed indicia;

responsive to receiving the indication that the requested item has been delivered, decrementing the available inventory of the requested food or beverage item in the vessel inventory database; and a second of the plurality of entertainment devices, the second device coupled to the first entertainment device, the amenities module and the vessel inventory database, and adapted to:

obtain from the vessel inventory database updated information describing the available food and beverage items aboard the aircraft, the updated information reflective of the decrementing by the amenities module, and to display a description of the available food and beverage items, wherein responsive to a determination that the available inventory of the item requested by the first passenger is zero, the description of the available food and beverage items displayed to the second passenger does not include the item requested by the first passenger.

8. The aircraft of claim 7 wherein the amenities module is a tablet PC.

9. The aircraft of claim 7 wherein the amenities module is fixed to a galley of the aircraft.

10. The aircraft entertainment system of claim 7 wherein the amenities module includes a plurality of input buttons for receiving entry of new requests for food and beverages, and is further adapted to:

receive a selection of an input button enabling entry of new requests for food and beverages;

receive via an order fulfillment screen input specifying order information for a second request for food and beverages;

receive via the order fulfillment screen input indicating that the second request has been completed; and update the stored inventory information based on the second request.

11. The aircraft entertainment system of claim 10, the amenities module further configured to:

receive via the order fulfillment screen input for viewing additional order information; and display an order details screen including, for each item in the received request, a quantity, description, price, and subtotal.

12. The aircraft entertainment system of claim 7 wherein at least some of the described food and beverage items are available at no cost.

13. A computer program product for providing service items to an aircraft passenger, the computer program product stored on a non-transitory computer readable medium and including program code for performing steps comprising:

receiving aboard an aircraft passenger manifest data for a flight;

receiving aboard the aircraft, inventory information describing available food and beverage items aboard the aircraft, the inventory information including an available quantity of each item;

receiving aboard the aircraft passenger preference data received from passengers on the flight prior to embarkation aboard the aircraft;

identifying, from the received passenger preference data, passenger preference data for a first passenger, the passenger preference data indicating a special meal type for the first passenger;

displaying to the first passenger aboard the aircraft on a first entertainment device a plurality of menu options, the menu options including an entertainment option and a food ordering option;

receiving from the first passenger at the first entertainment device a selection of the food ordering option;

responsive to the selection of the food ordering option, displaying on the first entertainment device a description of the available food and beverage items associated with the special meal type indicated for the first passenger, at least some of the items having a displayed associated cost;

receiving, at the first entertainment device, a request from the first passenger for one of the displayed food or beverage items;

receiving, at the first entertainment device, payment from the first passenger of the cost associated with the requested food or beverage item;

responsive to receiving the payment from the first passenger, displaying on an amenities module a description of the requested item and a seat location of the first passenger;

receiving, at the amenities module, an indication that the requested item has been delivered to the first passenger in response to the displaying on the amenities module of the description of the requested item;

responsive to receiving the indication that the requested item has been delivered, decrementing the available inventory of the requested food or beverage item; and displaying on a second entertainment device accessible to a second passenger a description of the available food and beverage items, wherein responsive to a determination that the available inventory of the item requested by the first passenger is zero, the description of the available food and beverage items displayed to the second passenger does not include the item requested by the first passenger.

14. The computer program product of claim 13 wherein at least some of the described food and beverage items are available at no cost.

15. The computer program product of claim 13 wherein the amenities module includes a plurality of input buttons for receiving entry of new requests for food and beverages, and the steps further comprising:

receiving at the amenities module a selection of an input button enabling entry of new requests for food and beverages;

receiving via an order fulfillment screen input specifying order information for a second request for food and beverages;

receiving via the order fulfillment screen input indicating that the second request has been completed; and updating the stored inventory information based on the second request.

16. The computer program product of claim 15, the steps further comprising:

receiving via the order fulfillment screen input for viewing additional order information; and displaying an order details screen including, for each item in the received request, a quantity, description, price, and subtotal.

* * * * *